US009631485B2

(12) United States Patent
Keller et al.

(10) Patent No.: US 9,631,485 B2
(45) Date of Patent: Apr. 25, 2017

(54) ELECTRO-ACOUSTIC TRANSMISSION OF DATA ALONG A WELLBORE

(71) Applicants: Stuart R. Keller, Houston, TX (US); Timothy I. Morrow, Humble, TX (US); Max Deffenbaugh, Fulshear, TX (US); Mark M. Disko, Glen Gardner, NJ (US); David A. Stiles, Spring, TX (US)

(72) Inventors: Stuart R. Keller, Houston, TX (US); Timothy I. Morrow, Humble, TX (US); Max Deffenbaugh, Fulshear, TX (US); Mark M. Disko, Glen Gardner, NJ (US); David A. Stiles, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 69 days.

(21) Appl. No.: 14/434,728

(22) PCT Filed: Dec. 18, 2013

(86) PCT No.: PCT/US2013/076286
§ 371 (c)(1),
(2) Date: Apr. 9, 2015

(87) PCT Pub. No.: WO2014/100276
PCT Pub. Date: Jun. 26, 2014

(65) Prior Publication Data
US 2015/0285066 A1    Oct. 8, 2015

Related U.S. Application Data

(60) Provisional application No. 61/739,677, filed on Dec. 19, 2012.

(51) Int. Cl.
*E21B 47/16* (2006.01)
*E21B 47/01* (2012.01)
(Continued)

(52) U.S. Cl.
CPC .......... *E21B 47/16* (2013.01); *E21B 17/1078* (2013.01); *E21B 47/011* (2013.01); *G01V 11/002* (2013.01)

(58) Field of Classification Search
CPC .... E21B 47/16; E21B 17/1078; E21B 47/011; H04B 11/00; G01V 11/002
(Continued)

(56) References Cited

U.S. PATENT DOCUMENTS 4,314,365 A    2/1982    Peterson et al.
4,884,071 A    11/1989   Howard
(Continued)

FOREIGN PATENT DOCUMENTS

EP    0 636 763    2/1995
EP    1 409 839    4/2005
(Continued)

OTHER PUBLICATIONS

Emerson Process Management (2011), "Roxar downhole Wireless PT sensor system," www.roxar.com, or downhole@roxar.com, 2 pgs.

*Primary Examiner* — Ojiako Nwugo
(74) *Attorney, Agent, or Firm* — ExxonMobil Upstream Research Company

(57) ABSTRACT

A system for downhole telemetry employs a series of communications nodes spaced along a tubular body such as a pipe in a wellbore. The nodes allow hybrid wired-and-wireless communication between one or more sensors residing at the level of a subsurface formation and a receiver at the surface. The nodes employ electro-acoustic transducers
(Continued)

providing node-to-node communication up a wellbore at high data transmission rates. A method of transmitting data in a wellbore uses a plurality of data transmission nodes situated along a tubular body to deliver an alternating electrical and acoustic transmission of data along the wellbore.

51 Claims, 8 Drawing Sheets

(51) Int. Cl.
  *E21B 17/10* (2006.01)
  *G01V 11/00* (2006.01)

(58) Field of Classification Search
  USPC ........ 367/82; 340/853.4, 853.7, 854.4, 854.8
  See application file for complete search history.

(56) References Cited

U.S. PATENT DOCUMENTS

| | | | |
|---|---|---|---|
| 5,128,901 A | 7/1992 | Drumheller | |
| 5,234,055 A | 8/1993 | Cornette | |
| 5,480,201 A | 1/1996 | Mercer | |
| 5,495,230 A | 2/1996 | Lian | |
| 5,562,240 A | 10/1996 | Campbell | |
| 5,592,438 A | 1/1997 | Rorden et al. | |
| 5,850,369 A | 12/1998 | Rorden et al. | |
| 5,924,499 A | 7/1999 | Birchak et al. | |
| 6,049,508 A | 4/2000 | Deflandre | |
| 6,429,784 B1 | 8/2002 | Beique et al. | |
| 6,462,672 B1 | 10/2002 | Besson | |
| 6,670,880 B1 | 12/2003 | Hall et al. | |
| 6,695,277 B1 | 2/2004 | Gallis | |
| 6,717,501 B2 | 4/2004 | Hall et al. | |
| 6,816,082 B1 | 11/2004 | Laborde | |
| 6,868,037 B2 | 3/2005 | Dasgupta et al. | |
| 6,899,178 B2 | 5/2005 | Tubel | |
| 6,912,177 B2 | 6/2005 | Smith | |
| 6,987,463 B2 | 1/2006 | Beique et al. | |
| 7,006,918 B2 | 2/2006 | Economides et al. | |
| 7,064,676 B2 | 6/2006 | Hall et al. | |
| 7,082,993 B2 | 8/2006 | Ayoub et al. | |
| 7,140,434 B2 | 11/2006 | Chouzenoux et al. | |
| 7,224,288 B2 | 5/2007 | Hall et al. | |
| 7,249,636 B2 | 7/2007 | Ohmer | |
| 7,257,050 B2 | 8/2007 | Stewart et al. | |
| 7,277,026 B2 | 10/2007 | Hall et al. | |
| 7,317,990 B2 | 1/2008 | Sinha et al. | |
| 7,348,893 B2 | 3/2008 | Huang et al. | |
| 7,477,160 B2 | 1/2009 | Lemenager et al. | |
| 7,516,792 B2 | 4/2009 | Lonnes et al. | |
| 7,595,737 B2 | 9/2009 | Fink et al. | |
| 7,602,668 B2 | 10/2009 | Liang et al. | |
| 7,649,473 B2 | 1/2010 | Johnson et al. | |
| 7,775,279 B2 | 8/2010 | Marya et al. | |
| 8,044,821 B2 | 10/2011 | Mehta | |
| 8,049,506 B2 | 11/2011 | Lazarev | |
| 8,115,651 B2 | 2/2012 | Camwell et al. | |
| 8,162,050 B2 | 4/2012 | Roddy et al. | |
| 8,220,542 B2 | 7/2012 | Whitsitt et al. | |
| 8,237,585 B2 | 8/2012 | Zimmerman | |
| 8,242,928 B2 | 8/2012 | Prammer | |
| 8,330,617 B2 | 12/2012 | Chen et al. | |
| 8,347,982 B2 | 1/2013 | Hannegan et al. | |
| 8,381,822 B2 | 2/2013 | Hales et al. | |
| 8,434,354 B2 | 5/2013 | Crow et al. | |
| 8,496,055 B2 | 7/2013 | Mootoo et al. | |
| 8,539,890 B2 | 9/2013 | Tripp et al. | |
| 2002/0026958 A1* | 3/2002 | Brisco | E21B 17/02 137/268 |
| 2002/0043369 A1 | 4/2002 | Vinegar et al. | |
| 2003/0056953 A1 | 3/2003 | Tumlin et al. | |
| 2004/0065443 A1 | 4/2004 | Berg et al. | |
| 2004/0073370 A1 | 4/2004 | Dasgupta et al. | |
| 2004/0084190 A1 | 5/2004 | Hill et al. | |
| 2004/0105342 A1* | 6/2004 | Gardner | E21B 47/16 367/25 |
| 2004/0256113 A1 | 12/2004 | LoGiudice et al. | |
| 2005/0024231 A1 | 2/2005 | Fincher et al. | |
| 2005/0039912 A1 | 2/2005 | Hall et al. | |
| 2005/0145010 A1 | 7/2005 | Vanderveen et al. | |
| 2005/0168349 A1* | 8/2005 | Huang | E21B 47/182 340/854.3 |
| 2005/0284659 A1 | 12/2005 | Hall et al. | |
| 2006/0002232 A1 | 1/2006 | Shah et al. | |
| 2006/0115095 A1 | 6/2006 | Giesbrecht et al. | |
| 2006/0124310 A1 | 6/2006 | Lopez de Cardenas et al. | |
| 2006/0133203 A1 | 6/2006 | James et al. | |
| 2006/0187755 A1* | 8/2006 | Tingley | E21B 47/16 367/82 |
| 2007/0024464 A1 | 2/2007 | Lemenager et al. | |
| 2007/0029112 A1* | 2/2007 | Li | E21B 17/003 175/26 |
| 2007/0030762 A1 | 2/2007 | Huang et al. | |
| 2007/0139217 A1 | 6/2007 | Beique et al. | |
| 2009/0045974 A1 | 2/2009 | Patel | |
| 2009/0159272 A1 | 6/2009 | Auzerais et al. | |
| 2009/0264956 A1 | 10/2009 | Rise et al. | |
| 2009/0277688 A1* | 11/2009 | Oothoudt | E21B 27/005 175/57 |
| 2009/0289808 A1 | 11/2009 | Prammer | |
| 2010/0013663 A1 | 1/2010 | Cavender et al. | |
| 2010/0126718 A1 | 5/2010 | Lilley | |
| 2010/0157739 A1 | 6/2010 | Slocum et al. | |
| 2010/0176813 A1 | 7/2010 | Simon | |
| 2010/0194584 A1 | 8/2010 | Savage | |
| 2011/0066378 A1 | 3/2011 | Lerche et al. | |
| 2011/0168403 A1 | 7/2011 | Patel | |
| 2011/0186290 A1* | 8/2011 | Roddy | E21B 43/25 166/253.1 |
| 2011/0275313 A1 | 11/2011 | Baldemair et al. | |
| 2011/0280294 A1 | 11/2011 | Luo et al. | |
| 2011/0297376 A1 | 12/2011 | Holderman et al. | |
| 2012/0017673 A1 | 1/2012 | Godager | |
| 2012/0024050 A1 | 2/2012 | Godager | |
| 2012/0024052 A1 | 2/2012 | Eriksen | |
| 2012/0043079 A1 | 2/2012 | Wassouf et al. | |
| 2012/0090687 A1 | 4/2012 | Grigsby et al. | |
| 2012/0170410 A1 | 7/2012 | Hay | |
| 2012/0241172 A1 | 9/2012 | Ludwig et al. | |
| 2012/0250461 A1* | 10/2012 | Millot | H04B 11/00 367/82 |
| 2012/0256415 A1 | 10/2012 | Dole | |
| 2012/0256492 A1 | 10/2012 | Song et al. | |
| 2012/0257475 A1 | 10/2012 | Luscombe et al. | |
| 2013/0008648 A1 | 1/2013 | Lovorn et al. | |
| 2013/0106615 A1 | 5/2013 | Prammer | |
| 2013/0110402 A1 | 5/2013 | Godager | |
| 2013/0175094 A1 | 7/2013 | Ross et al. | |
| 2013/0239673 A1* | 9/2013 | Garcia-Osuna | E21B 17/16 73/152.46 |
| 2013/0248174 A1 | 9/2013 | Dale et al. | |
| 2015/0354351 A1* | 12/2015 | Morrow | E21B 47/01 367/82 |

FOREIGN PATENT DOCUMENTS

| | | |
|---|---|---|
| WO | WO 2010/074766 | 7/2010 |
| WO | WO 2013/079928 | 6/2013 |
| WO | WO 2013/079929 | 6/2013 |

\* cited by examiner

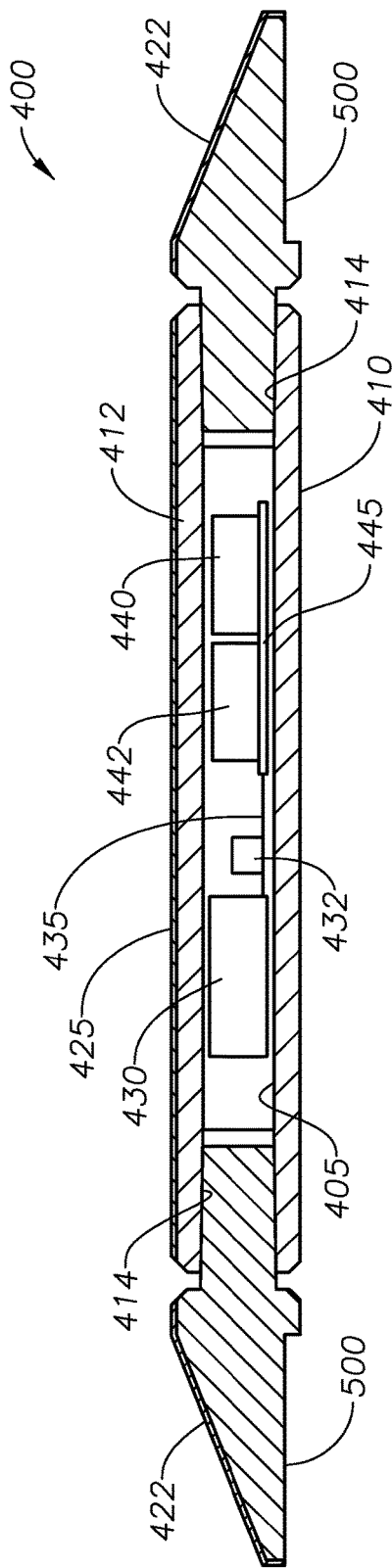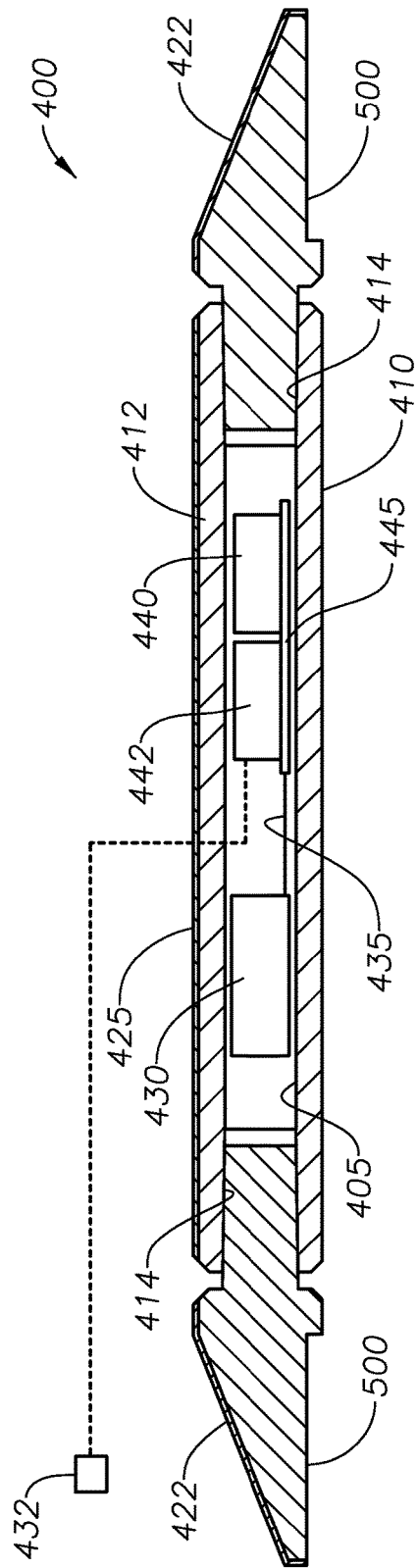
FIG. 4B
FIG. 4C

ELECTRO-ACOUSTIC TRANSMISSION OF DATA ALONG A WELLBORE

CROSS-REFERENCE TO RELATED APPLICATION

This application is the National Stage of International Application No. PCT/US2013/076286, filed Dec. 18, 2013, which claims the benefit of U.S. Ser. No. 61/739,677 filed Dec. 19, 2012, the disclosure of which is hereby incorporated by reference in its entirety. This application is also related to co-pending U.S. Ser. Nos. 61/739,414 (PCT/US2013/076273), 61/739,678 (PCT/US2013/076284), 61/739,679 (PCT/US2013/076282), and 61,739,681 (PCT/US2013/076278), each filed on Dec. 19, 2012, the entire contents of each of which are also hereby incorporated by reference herein.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present invention relates to the field of data transmission along a tubular body, such as a steel pipe. More specifically, the invention relates to the transmission of data along a pipe within a wellbore or along the surface. The present invention further relates to a hybrid wired-and-wireless transmission system for transmitting data up a drill string during a drilling operation, or along the casing during drilling or production operations.

General Discussion of Technology

It is desirable to transmit data along a pipeline without the need for wires or radio frequency (electromagnetic) communications devices. Examples abound where the installation of wires is either technically difficult or economically impractical. The use of radio transmission may also be impractical or unavailable in cases where radio-activated blasting is occurring, or where the attenuation of radio waves near the tubular body is significant.

Likewise, it is desirable to collect and transmit data along a tubular body in a wellbore, such as during a drilling process. Such data may include temperature, pressure, rate of rock penetration, inclination, azimuth, fluid composition, and local geology. In the drilling of oil and gas wells, a wellbore is formed using a drill bit that is urged downwardly at a lower end of a drill string. The drill bit is rotated while force is applied through the drill string and against the rock face of the formation being drilled. In order to obtain such information, special downhole assemblies have been developed. These assemblies are generally referred to as Logging While Drilling (LWD) or Measurement While Drilling (MWD) assemblies.

LWD and MWD assemblies allow for more efficient drilling programs. Particularly, bottom hole assemblies having LWD and MWD capabilities are able to store or transmit information about subsurface conditions for review by drilling or production operators at the surface. LWD and MWD techniques generally seek to reduce the need for tripping the drill string and running wireline logs to obtain downhole data.

A variety of technologies have been proposed or developed for downhole communications using LWD or MWD. In one form, MWD and LWD information is simply stored in a processor having memory. The processor is retrieved and the information is downloaded later when the drill string is pulled, such as when a drill bit is changed out or a new bottom hole assembly is installed.

Several real time data telemetry systems have also been proposed. One involves the use of a physical cable such as an electrical conductor or a fiber optic cable that is secured to the tubular body. The cable may be secured to either the inner or outer diameter of the pipe. The cable provides a hard wire connection that allows for real time transmission of data and the immediate evaluation of subsurface conditions. Further, these cables allow for high data transmission rates and the delivery of electrical power directly to downhole sensors.

It can be readily perceived that the placement of a physical cable along a string of drill pipe during drilling is problematic. In this respect, the cable will become quickly tangled and will break if secured along a rotating drill string. This problem is lessened when a downhole mud motor is used that allows for a generally non-rotating drill pipe. However, even in this instance the harsh downhole environment and the considerable force of the pipe as it scrapes across the surrounding borehole can impair the cable.

It has been proposed to place a physical cable along the outside of a casing string during well completion. However, this can be difficult as the placement of wires along a pipe string requires that thousands of feet of cable be carefully unspooled and fed during pipe connection and run-in. Further, the use of hard wires in a well completion requires the installation of a specially-designed well head that includes through-openings for the wires. In addition, if the wire runs outside of a casing string, this creates a potential weak spot in the cement sheath that may contribute to a loss of pressure isolation between subsurface intervals. It is generally not feasible to pass wires through a casing mandrel for subsea applications. In sum, passing cable in the annulus adds significant cost, both for equipment and for rig time, to well completions.

Mud pulse telemetry, or mud pressure pulse transmission, is commonly used during drilling to obtain real time data from sensors at or near the drill bit. Mud pulse telemetry employs variations in pressure in the drilling mud to transmit signals from the bottom hole assembly to the surface. The variations in pressure may be sensed and analyzed by a computer at the surface.

A downside to mud pulse telemetry is that it transmits data to the surface at relatively slow rates, typically at rates of less than 20 bits per second (bps). This rate decreases as the length of the wellbore increases, even down to 10 or even 5 bps. Slow data transmission rates can be costly to the drilling process. For example, the time it takes to downlink instructions and uplink survey data (such as azimuth and inclination), during which the drill string is normally held stationary, can be two to seven minutes. Since many survey stations are typically required, this downlink/uplink time can be very expensive, especially on deepwater rigs where daily operational rates can exceed $2 million. Similarly, the time it takes to downlink instructions and uplink data associated with many other tasks such as setting parameters in a rotary steerable directional drilling tool or obtaining a pressure reading from a pore-pressure-while-drilling tool can be very costly.

The use of acoustic telemetry has also been suggested. Acoustic telemetry employs an acoustic signal generated at or near the bottomhole assembly or bottom of a pipe string. The signal is transmitted through the wellbore pipe, meaning that the pipe becomes the carrier medium for sound waves. Transmitted sound waves are detected and converted to electrical signals for analysis.

U.S. Pat. No. 5,924,499 entitled "Acoustic Data Link and Formation Property Sensor for Downhole MWD System," teaches the use of acoustic signals for "short hopping" a component along a drill string. Signals are transmitted from the drill bit or from a near-bit sub and across the mud motors. This may be done by sending separate acoustic signals simultaneously—one that is sent through the drill string, a second that is sent through the drilling mud, and optionally, a third that is sent through the formation. These signals are then processed to extract readable signals.

U.S. Pat. No. 6,912,177, entitled "Transmission of Data in Boreholes," addresses the use of an acoustic transmitter that is as part of a downhole tool. Here, the transmitter is provided adjacent a downhole obstruction such as a shut-in valve along a drill stem so that an electrical signal may be sent across the drill stem. U.S. Pat. No. 6,899,178, entitled "Method and System for Wireless Communications for Downhole Applications," describes the use of a "wireless tool transceiver" that utilizes acoustic signaling. Here, an acoustic transceiver is in a dedicated tubular body that is integral with a gauge and/or sensor. This is described as part of a well completion.

Another telemetry system that has been suggested involves electromagnetic (EM) telemetry. EM telemetry employs electromagnetic waves, or alternating current magnetic fields, to "jump" across pipe joints. In practice, a specially-milled drill pipe is provided that has a conductor wire machined along an inner diameter. The conductor wire transmits signals to an induction coil at the end of the pipe. The induction coil, in turn, then transmits an EM signal to another induction coil, which sends that signal through the conductor wire in the next pipe. Thus, each threaded connection provides a pair of specially milled pipe ends for EM communication.

A service company, National Oilwell Varco® of Houston, Tex., offers a drill pipe network, referred to as IntelliServ' that uses EM telemetry. The IntelliServ® system employs drill pipe having integral wires that can transmit LWD/MWD data to the surface at speeds of up to 1 Mbps. This creates a communications system from the drill string itself. The IntelliServ® communications system uses an induction coil built into both the threaded box and pin ends of each drill pipe so that data may be transmitted across each connection. Examples of IntelliServ® patents are U.S. Pat. No. 7,277,026 entitled "Downhole Component With Multiple Transmission Elements," and U.S. Pat. No. 6,670,880 entitled "Downhole Data Transmission System."

Faster data transmission rates with some level of clarity have been accomplished using EM telemetry; however, it is observed that the induction coils in an EM telemetry system must be precisely located in the box and pin ends of the joints of the drill string to ensure reliable data transfer. For a long (e.g., 20,000 foot) well, there can be more than 600 tool joints. The represents over 600 pipe sections to be threadedly connected. Further, each threaded connection is preferably tested at the drilling platform to ensure proper functioning.

National Oilwell Varco® promotes its IntelliServ® system as providing the oil and gas industry's "only high-speed, high-volume, high-definition, bi-directional broadband data transmission system that enables downhole conditions to be measured, evaluated, monitored and actuated in real time."

However, the IntelliServe® system generally requires the use of booster assemblies along the drill string. These can be three to six foot sub joints having a diameter greater than the drill pipe placed in the drill string. The booster assemblies, referred to sometimes as "signal repeaters," are located along the drill pipe about every 1,500 feet. The need for repeaters coupled with the need for specially-milled pipe can make the IntelliServe® system a very expensive option.

Recently, the use of radiofrequency signals has been suggested. This is offered in U.S. Pat. No. 8,242,928 entitled "Reliable Downhole Data Transmission System." This patent suggests the use of electrodes placed in the pin and box ends of pipe joints. The electrodes are tuned to receive RF signals that are transmitted along the pipe joints having a conductor material placed there along, with the conductor material being protected by a special insulative coating.

While high data transmission rates can be accomplished using RF signals in a downhole environment, the transmission range is typically limited to a few meters. This, in turn, requires the use of numerous repeaters.

Accordingly, a need exists for a high speed data transmission system in a wellbore that does not require the machining of induction coils with precise grooves placed into pipe ends or the need for electrodes in the pipe ends. Further, a need exists for such a transmission system that does not require the precise alignment of induction coils or the placement of RF electrodes between pipe joints. In addition, a need exists for a hybrid wired-and-wireless transmission system that does not require special booster assemblies along the drill string but yet provides high speed data transmission.

SUMMARY OF THE INVENTION

A downhole acoustic telemetry system is first provided herein. The system employs novel communications nodes spaced along pipe joints within a wellbore. The pipe joints may be, for example, joints of drill pipe, joints of casing (including a liner), joints of production tubing, or joints of an injection tubing.

In one aspect, the acoustic telemetry system has a first tubular body. The first tubular body is a joint of pipe that is fabricated from a steel material, with the steel material having a resonant frequency. The tubular body has a pin end, a box end, and an elongated wall between the pin end and the box end.

The system also includes a pair of communications nodes. The communications nodes are attached to the pipe joint. These communications nodes represent a pin end communications node and a box end communications node. The pin end communications node is secured to an outer surface of the first tubular body proximate the pin end, while the box end communications node is secured to an outer surface of the first tubular body proximate the box end. Each of the communications nodes is independently powered.

The system further includes a conductive wire. The conductive wire is placed along the elongated wall of the tubular body. The conductive wire places the communications nodes in electrical communication with one another. The conductive wire may be embedded into the pipe wall. Alternatively, the conductive wire may be run inside or outside of the joints making up the tubular body.

Each of the communications nodes includes a housing, which is fabricated from a steel material. Each of the communications nodes also has a bore formed within the housing. The bore holds electronic components, including an electro-acoustic transducer and associated transceiver.

The transceiver is designed to communicate with an adjacent communications node along the tubular body using electrical signals carried through the conductive wire. In addition, the transceiver is configured to send acoustic signals across joint couplings along the tubular body that correlate to the electrical signals. In this way, the tubular body is part of an electro-acoustic telemetry system.

The communications nodes are generally spaced along an outer surface of the pipe joint at opposite ends, although they may alternatively be spaced along an inner surface. Preferably, each of the communications nodes comprises at least one clamp for radially clamping the communications node onto the tubular body.

In one aspect, the system includes a second tubular body. The second tubular body is constructed in accordance with the first tubular body described above, including having the pin end communications node and the box end communications node. The first and second tubular bodies are threaded together to form a coupling. The pin end communications node of the second tubular body is adjacent to and in acoustic communication with the box end communications node of the first tubular body.

In this embodiment, the transceiver in the pin end communications node of the second tubular body comprises an electro-acoustic transducer that is designed to (i) receive acoustic waves from the box end communications node secured to the first tubular body through the steel material of the first and second tubular bodies, (ii) convert the acoustic waves into electrical signals, and (iii) transmit the electrical signals to the box end communications node on the second tubular body. The transceiver in the box end communications node of the first tubular body, in turn, comprises an electro-acoustic transducer designed to (i) receive electrical signals from the transceiver in the pin end communications node of the first tubular body through the conductive wire, (ii) convert the electrical signals into acoustic waves, and (iii) transmit the acoustic waves through the steel material of the first and second tubular bodies to the transceiver of the pin end in the second tubular body.

A separate system for downhole acoustic telemetry is also provided herein. This system employs a series of communications nodes spaced along a wellbore. The nodes allow for communication between one or more sensors residing at the level of a subsurface formation, and a receiver at the surface.

The system first includes a tubular body disposed in the wellbore. Where the wellbore is being formed, the tubular body is a drill string, with the wellbore progressively penetrating into a subsurface formation. The subsurface formation preferably represents a rock matrix having hydrocarbon fluids available for production in commercially acceptable volumes. Thus, the wellbore is to be completed as a production well, or "producer." Alternatively, the wellbore is to be completed as either an injection well or a formation monitoring well.

In another aspect, the wellbore is being completed or has already been completed. The tubular body is then a casing string or, alternatively, a production string such as tubing. In either instance, the tubular body is made up of a plurality of pipe joints that are threadedly connected end-to-end. Each joint of pipe has a conductive wire extending substantially from one end of the joint, along the pipe body to the other end of that joint. The ends of the pipe joint may include a threaded male end ("pin") or female end ("box"), and may or may not include a collar, coupling, or connector sub that joins the joint of pipe with an adjacent joint of pipe. In other arrangements, one end of the joint may be a pin while the other end of the joint is a box. The subject matter of this disclosure is applicable to any arrangement of the joint connection types.

The system also includes at least one sensor. As noted, the sensor is disposed along the wellbore at a depth of the subsurface formation. The sensor may be, for example, a temperature sensor, a pressure sensor, a microphone, a geophone, a vibration sensor, a resistivity sensor, a fluid flow measurement device, a formation density sensor, a fluid identification sensor, or a strain gauge. Where the wellbore is being drilled, the sensor may alternatively be a set of position sensors indicating, inclination, azimuth, and orientation.

The system further has a sensor communications node. The sensor communications node is placed along the wellbore. The sensor communications node is connected to the tubular body at the depth of the subsurface formation. The sensor communications node is in electrical communication with the at least one sensor.

The sensor communications node is configured to receive signals from the at least one sensor. The signals represent a subsurface condition such as temperature, fluid flow volume, fluid resistivity, fluid identification, ambient noise, acoustic attenuation, the presence of elastic waves, or pressure. The sensor communications node preferably includes a sealed housing for holding electronic components.

The system also comprises a topside communications node. The topside communications node is placed along the wellbore proximate the surface, or at the wellhead. The surface may be an earth surface. Alternatively, in a subsea context, the surface may be an offshore platform such as an FPSO, a floating ship-shaped vessel, or offshore rig.

The system further includes a plurality of intermediate communications nodes. The intermediate communications nodes are attached to each joint of pipe making up the tubular body, in pairs. The intermediate communications nodes are configured to transmit electro-acoustic waves from the sensor communications node to the topside communications node.

Each of the intermediate communications nodes has an independent power source. The power source may be, for example, batteries or a fuel cell. In addition, each of the intermediate communications nodes has an electro-acoustic transceiver. The transceiver is designed to communicate with an adjacent communications node using electrical signals carried through the conductive wire in the pipe joint, and using acoustic signals that cross joint couplings along the tubular body.

The acoustic waves represent the data generated by the sensor. In this way, data about subsurface conditions are transmitted from node-to-node up to the surface. In one aspect, the communications nodes transmit data as mechanical waves at a rate exceeding about 50 bps. In a preferred embodiment, multiple frequency shift keying (MFSK) is the modulation scheme enabling the transmission of information.

A separate method of transmitting data in a wellbore is also provided herein. The method uses a plurality of data transmission nodes situated along a tubular body to accomplish a hybrid wired-and-wireless transmission of data along the wellbore. The wellbore penetrates into a subsurface formation, allowing for the communication of a wellbore condition at the level of the subsurface formation up to the surface.

The method first includes providing a plurality of pipe joints. Each pipe joint has (i) a first end, (ii) a second end, (iii) a tubular wall, and (iv) a conductive wire embedded into or otherwise placed along the wall. The conductive wire extends substantially from the first end to the second end. Each of the first and second ends of a joint of tubular pipe may be a pin end or each end may be a box end, or one end may be a pin end while the second end is a box end (for directly receiving a pin therein), to form a connection with and adjacent joint of pipe. Pipe joints having pins on each end or boxes on each end require a coupling such as a collar or connector sub to connect with an adjacent pipe joint.

The method also includes running the plurality of pipe joints into the wellbore. This is done by threadedly connecting the respective the second end of one joint of pipe with the first end of an adjacent joint of pipe, thereby forming an elongated tubular body.

The method also includes attaching a pin end communications node to an outer surface of the tubular body. The pin end communications node is attached proximate the pin end of each of the pipe joints. In addition, the method includes attaching a box end communications node to an outer surface of the tubular body. The box end communications node is attached proximate the box end of each of the pipe joints.

In a preferred embodiment, the attaching steps comprise clamping the various communications nodes to the tubular body. The communications nodes are welded or otherwise pre-attached to one or more clamps, which are then secured around the tubular body during run-in.

The method additionally includes placing or otherwise providing at least one sensor along the wellbore. The sensor is placed at a depth of the subsurface formation. The sensor may be a temperature sensor, a pressure sensor, a microphone, a geophone, a vibration sensor, a resistivity sensor, a position sensor, a fluid flow measurement device, a formation density sensor, a fluid identification sensor, a strain gauge, or other sensor.

The method may further include attaching a sensor communications node to the tubular body. The sensor communications node is then placed at the depth of the subsurface formation. The sensor communications node is in electrical communication with the at least one sensor. This is preferably by means of a short wired connection. In one aspect, the sensor resides within the housing of a sensor communications node. In any event, the sensor communications node is configured to receive signals from the at least one sensor. The signals represent a subsurface condition such as temperature, pressure, inclination, the presence of elastic (or seismic) waves, fluid composition, fluid resistivity, formation density, or geology.

The method may also provide for attaching a topside communications node to the tubular body or other structure, such as the wellhead or the BOP, that is connected to the tubular body. The topside communications node is provided along the wellbore proximate the surface.

The method further comprises transmitting an electro-acoustic signal from the sensor and up the wellbore from node-to-node. This is done through an electro-acoustic transducer and associated transceiver that resides within each node. The transceivers communicate with an adjacent communications node on a pipe joint using electrical signals carried through the conductive wire. Additionally, the transceivers communicate with an adjacent communications node on an adjacent pipe joint through acoustic signals that are sent across joint couplings along the tubular body. The acoustic signals correlate to the electrical signals.

In one aspect, the method further includes receiving a signal from the topside communications node at a receiver. The receiver preferably receives electrical or optical signals from the topside communications node. In one embodiment, the electrical or optical signals are conveyed in a conduit suitable for operation in an electrically classified area, that is, via a so-called "Class I, Division. I" conduit (as defined by NFPA 497 and API 500). Alternatively, data can be transferred from the topside communications node to a receiver via an electromagnetic (RF) wireless connection. The electrical signals may then be processed and analyzed at the surface.

BRIEF DESCRIPTION OF THE DRAWINGS

So that the present inventions can be better understood, certain drawings, charts, graphs and/or flow charts are appended hereto. It is to be noted, however, that the drawings illustrate only selected embodiments of the inventions and are therefore not to be considered limiting of scope, for the inventions may admit to other equally effective embodiments and applications.

FIG. 4B is a cross-sectional view of the communications node of FIG. 4A. The view is taken along the longitudinal axis of the node. Here, a sensor is provided within the communications node.

FIG. 4C is another cross-sectional view of the communications node of FIG. 4A. The view is again taken along the longitudinal axis of the node. Here, a sensor resides along the wellbore external to the communications node.

In FIG. 5A, the leading edge, or front, of the shoe is seen. In FIG. 5B, the back of the shoe is seen.

DETAILED DESCRIPTION OF CERTAIN EMBODIMENTS

DEFINITIONS

As used herein, the term "hydrocarbon" refers to an organic compound that includes primarily, if not exclusively, the elements hydrogen and carbon. Examples of hydrocarbons include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° C. and 1 atm pressure). Hydrocarbon fluids may include, for example, oil, natural gas, gas condensates, coal bed methane, shale oil, shale gas, and other hydrocarbons that are in a gaseous or liquid state.

As used herein, the term "subsurface" refers to geologic strata occurring below the earth's surface.

As used herein, the term "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, the term "formation" refers to any definable subsurface region. The formation may contain one or more hydrocarbon-containing layers, one or more non-hydrocarbon containing layers, an overburden, and/or an underburden of any geologic formation.

The terms "zone" or "zone of interest" refer to a portion of a subsurface formation containing hydrocarbons. The term "hydrocarbon-bearing formation" may alternatively be used.

As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

The terms "tubular member" or "tubular body" refer to any pipe, such as a joint of casing, a portion of a liner, a drill string, a production tubing, an injection tubing, a pup joint, a buried pipeline, underwater piping, or above-ground piping.

Description of Selected Specific Embodiments

The inventions are described herein in connection with certain specific embodiments. However, to the extent that the following detailed description is specific to a particular embodiment or a particular use, such is intended to be illustrative only and is not to be construed as limiting the scope of the inventions.

Figure 1:
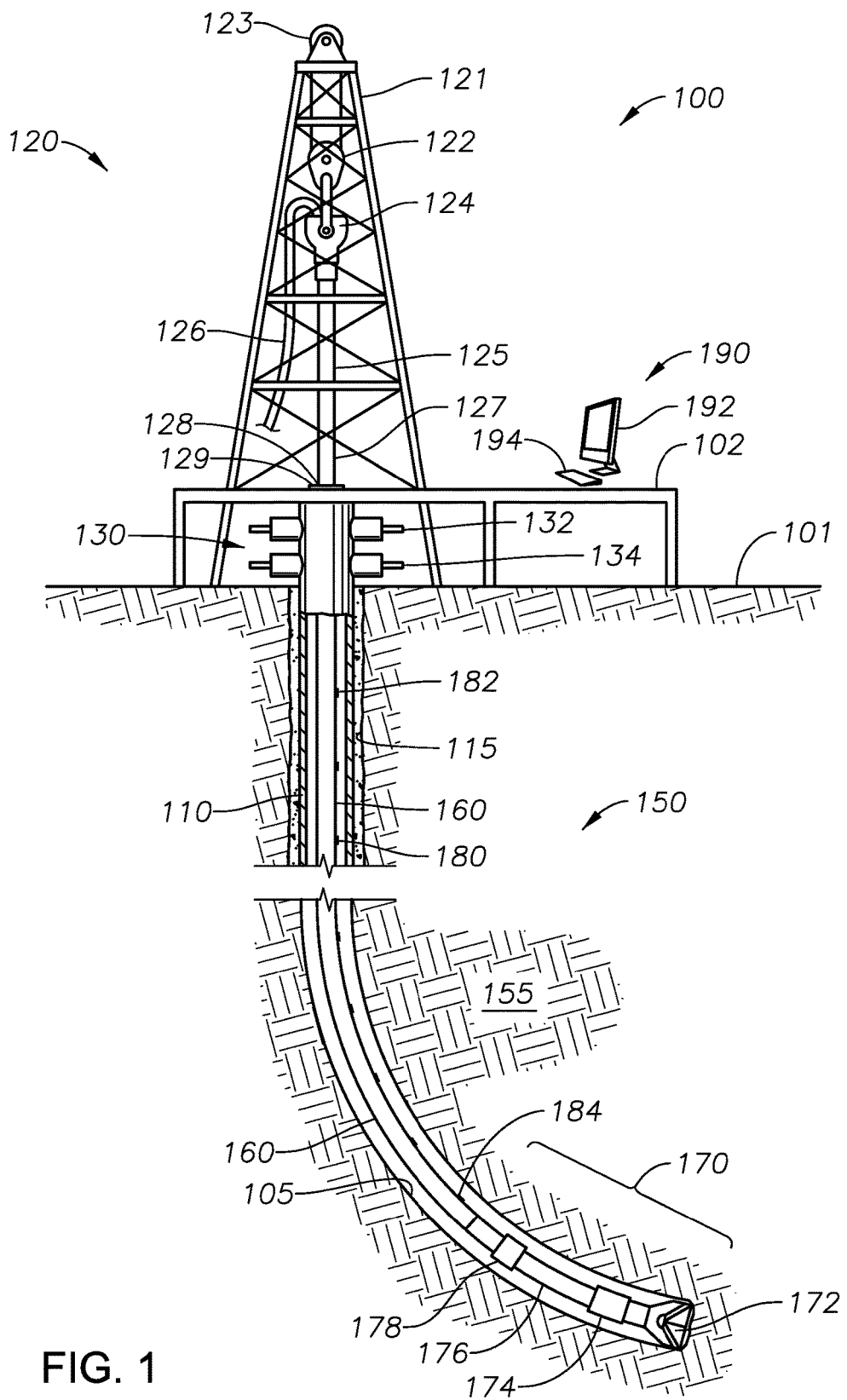
FIG. 1 is a side, cross-sectional view of an illustrative wellbore. The wellbore is being formed using a derrick, a drill string and a bottom hole assembly. A series of communications nodes is placed along the drill string as part of a telemetry system.

FIG. 1 is a side, cross-sectional view of an illustrative well site 100. The well site 100 includes a derrick 120 at an earth surface 101, and a wellbore 150 extending from the earth surface 101 into an earth subsurface 155. The wellbore 150 is being formed using the derrick 120, a drill string 160 below the derrick 120, and a bottom hole assembly 170 at a lower end of the drill string 160.

Referring first to the derrick 120, the derrick 120 includes a frame structure 121 that extends up from the earth surface 101 and which supports drilling equipment. The derrick 120 also includes a traveling block 122, a crown block 123 and a swivel 124. A so-called kelly 125 is attached to the swivel 124. The kelly 125 has a longitudinally extending bore (not shown) in fluid communication with a kelly hose 126. The kelly hose 126, also known as a mud hose, is a flexible, steel-reinforced, high-pressure hose that delivers drilling fluid through the bore of the kelly 125 and down into the drill string 160.

The kelly 125 includes a drive section 127. The drive section 127 is non-circular in cross-section and conforms to an opening 128 longitudinally extending through a kelly drive bushing 129. The kelly drive bushing 129 is part of a rotary table. The rotary table is a mechanically driven device that provides clockwise (as viewed from above) rotational force to the kelly 125 and connected drill string 160 to facilitate the process of drilling a borehole 105. Both linear and rotational movement may thus be imparted from the kelly 125 to the drill string 160.

A platform 102 is provided for the derrick 120. The platform 102 extends above the earth surface 101. The platform 102 generally supports rig hands along with various components of drilling equipment such as a pumps, motors, gauges, a dope bucket, pipe lifting equipment and control equipment. The platform 102 also supports the rotary table.

It is understood that the platform 102 shown in FIG. 1 is somewhat schematic. It is also understood that the platform 102 is merely illustrative and that many designs for drilling rigs, both for onshore and for offshore operations, exist. These include, for example, top drive drilling systems. The claims provided herein are not limited by the configuration and features of the drilling rig unless expressly stated in the claims.

Placed below the platform 102 and the kelly drive section 127 but above the earth surface 101 is a blow-out preventer, or BOP 130. The BOP 130 is a large, specialized valve or set of valves used to control pressures during the drilling of oil and gas wells. Specifically, blowout preventers control the fluctuating pressures emanating from subterranean formations during a drilling process. The BOP 130 may include upper 132 and lower 134 rams used to isolate flow on the back side of the drill string 160. Blowout preventers 130 also prevent the pipe joints making up the drill string 160 and the drilling fluid from being blown out of the wellbore 150 when a blowout threatens.

As shown in FIG. 1, the wellbore 150 is being formed down into the subsurface formation 155. In addition, the wellbore 150 is being shown as a deviated wellbore. Of course, this is merely illustrative as the wellbore 150 may be a vertical well or even a horizontal well, as shown later in FIG. 2.

In drilling the wellbore 150, a first string of casing 110 is placed down from the surface 101. This is known as surface casing 110 or, in some instances (particularly offshore), conductor pipe. The surface casing 110 is secured within the formation 155 by a cement sheath. The cement sheath resides within an annular region 115 between the surface casing 110 and the surrounding formation 155.

During the process of drilling and completing the wellbore 150, additional strings of casing (not shown) will be provided. These may include intermediate casing strings and a final production casing string. For an intermediate case string or the final production casing, a liner may be employed, that is, a string of casing that is not tied back to the surface 101.

As noted, the wellbore 150 is formed by using a bottom hole assembly 170. The bottom-hole assembly 170 allows the operator to control or "steer" the direction or orientation of the wellbore 150 as it is formed. In this instance, the bottom hole assembly 170 is known as a rotary steerable drilling system, or RSS.

The bottom hole assembly 170 will include a drill bit 172. The drill bit 172 may be turned by rotating the drill string 160 from the platform 102. Alternatively, the drill bit 172 may be turned by using so-called mud motors 174. The mud motors 174 are mechanically coupled to and turn the nearby drill bit 172. The mud motors 174 are used with stabilizers or bent subs 176 to impart an angular deviation to the drill bit 172. This, in turn, deviates the well from its previous path in the desired azimuth and inclination.

There are several advantages to directional drilling. These primarily include the ability to complete a wellbore along a substantially horizontal axis of a subsurface formation, thereby exposing a substantially greater formation face. These also include the ability to penetrate into subsurface formations that are not located directly below the wellhead. This is particularly beneficial where an oil reservoir is located under an urban area or under a large body of water. Another benefit of directional drilling is the ability to group multiple wellheads on a single platform, such as for offshore drilling. Finally, directional drilling enables multiple laterals and/or sidetracks to be drilled from a single wellbore in order to maximize reservoir exposure and recovery of hydrocarbons.

The illustrative well site 100 also includes a sensor 178. Here, the sensor 178 is part of the bottom hole assembly 170. The sensor 178 may be, for example, a set of position sensors that are part of the electronics for a RSS. Alternatively or in addition, the sensor 178 may be a temperature sensor, a pressure sensor, a vibration sensor, or other sensor for detecting a downhole condition during drilling. Alternatively still, the sensor may be an induction log, a formation density sensor, a sonic velocity sensor, a resistivity sensor, a gamma ray log or other log that detects fluid and/or geology downhole.

The sensor 178 is part of a MWD or a LWD assembly. It is observed that the sensor 178 is located above the mud motors 174. This is a common practice for MWD assemblies. This allows the electronic components of the sensor 178 to be spaced apart from the high vibration and centrifugal forces acting on the bit 172.

Where the sensor 178 is a set of position sensors, then the sensors may include three inclinometer sensors and three environmental acceleration sensors. These may include three inclinometer sensors and three environmental acceleration sensors. Ideally, a temperature sensor and a wear sensor will also be placed in the drill bit 172. These signals are input into a multiplexer and transmitted.

It is desirable to send signals about the downhole condition back to an operator at the surface 101. To do this, a telemetry system is used. As discussed above, various telemetry systems are known in the industry. However, the well site 100 of FIG. 1 presents a telemetry system that utilizes a series of novel communications nodes 180 placed along the drill string 160. These nodes 180 allow for the high speed transmission of electro-acoustic signals based on the in situ generation of acoustic waves.

The nodes first include a topside communications node 182. The topside communications node 182 is placed closest to the surface 101. The topside communications node 182 is configured to receive and/or transmit acoustic signals. The topside communications node can be below grade as shown in FIG. 1. More preferably, the topside communications node is above grade and is connected to the well head or to a tubular body immediately downstream from the well head.

The nodes also include a sensor communications node 184. The sensor communications node is placed closest to the sensor 178. The sensor communications node 182 is configured to communicate with the downhole sensor 178, and then send a signal to a lowermost communications node using either an acoustic wave or an electrical signal.

Finally, the nodes include a plurality of intermediate communications nodes 180. Each of the intermediate communications nodes 180 resides between the sensor communications node 182 and the topside communications node 184. The intermediate communications nodes 180 are configured to receive and relay signals along the length of the wellbore 150. The intermediate communications nodes 180 utilize electro-acoustic transducers to communicate signals along the wellbore in node-to-node arrangement.

In FIG. 1, the nodes 180 are shown schematically. However, FIG. 3A offers an enlarged perspective view of an illustrative pipe joint 300, along with a pair of communications nodes 350*b*, 350*p*. The illustrative communications nodes 350*b*, 350*p* are shown exploded away from the pipe joint 300 for clarity.

Figure 3A:
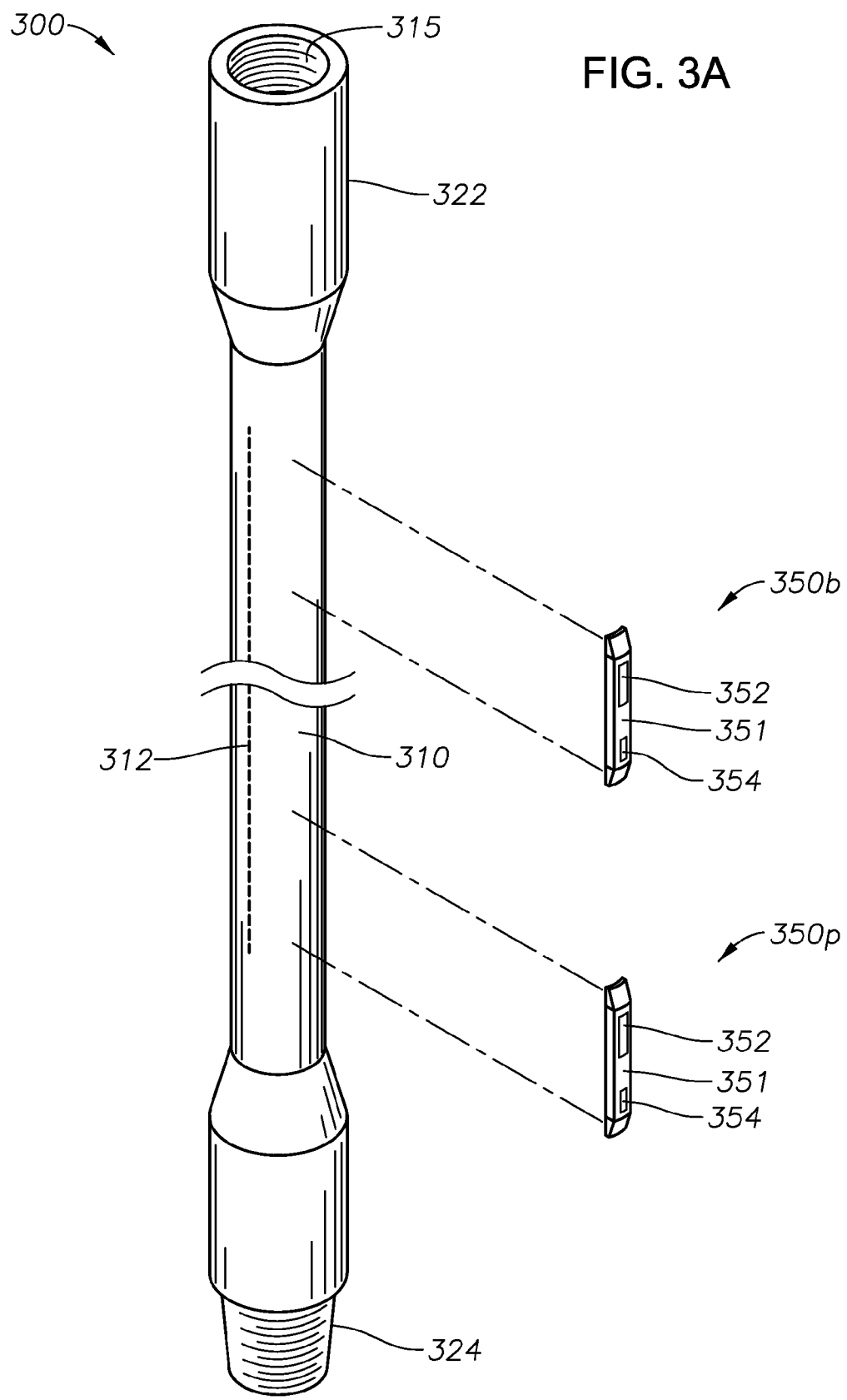
FIG. 3A is a perspective view of an illustrative pipe joint. A pair of electro-acoustical communications nodes is shown exploded away from the pipe joint.

In FIG. 3A, exemplary the pipe joint 300 is intended to represent a joint of drill pipe. However, the pipe joint 300 may be any other tubular body such as a joint of tubing or well casing pipe, or a pipe joint such as a flow line, transmission line, or a below ground, above ground, or subsea pipeline. The pipe joint 300 has an elongated wall 310 defining an internal bore 315. The bore 315 transmits drilling fluids such as an oil based mud, or OBM, during a drilling operation. The pipe joint 300 has a box end 322 having internal threads, and a pin end 324 having external threads.

As noted, pair of illustrative communications nodes 350*b*, 350*p* are shown exploded away from the pipe joint 300. A box end communications node 350*b* is secured to the pipe joint 300 proximate the box end 322, while a pin end communications node 350*p* is secured to the pipe joint 300 proximate the pin end 324. The respective communications nodes 350*p*, 350*b* are designed to attach to an outer surface of the wall 310 of the pipe joint 300 at the opposing ends 322, 324.

The communications nodes 350*p*, 350*b* shown in FIG. 3A are designed to be pre-welded onto the wall 310 of the pipe joint 300. Alternatively, the communications node 350 may be glued using an adhesive such as epoxy. However, it is preferred that the communications nodes 350*p*, 350*b* be configured to be selectively attachable to/detachable from a pipe joint 300 by mechanical means at a well site. This may be done, for example, through the use of clamps. Such a clamping system is shown at 600 in FIG. 6, described more fully below. In either instance, the communications nodes 350*p*, 350*b* offer an independently-powered, electro-acoustical communications device that is designed to be attached to an external surface of a well pipe.

There are benefits to the use of an externally-placed communications node that uses acoustic waves. For example, such a node will not interfere with the flow of fluids within the internal bore 315 of the pipe joint 300. Further, installation and mechanical attachment can be readily assessed or adjusted, as necessary. Because the acoustic signals are carried by the wall 310 of the pipe joint 300 itself, the data is largely unaffected by the fluids in the pipe joint 300.

In FIG. 3A, the communications nodes 350*p*, 350*b* include an elongated body 351. The body 351 supports one or more batteries, shown schematically at 352. The body 351 also supports an electro-acoustic transducer, shown schematically at 354. The electro-acoustic transducer 354 is associated with a transceiver that can either receiver or deliver acoustic signals along the wall 310 of the pipe joint 300. In addition, the electro-acoustic transducer 354 is configured to convert an acoustic signal into an electrical signal, and then send the signal along an insulated conductive wire 312 embedded into the pipe wall 310. Preferably, the electrical signal is a digital signal.

Figure 3B:
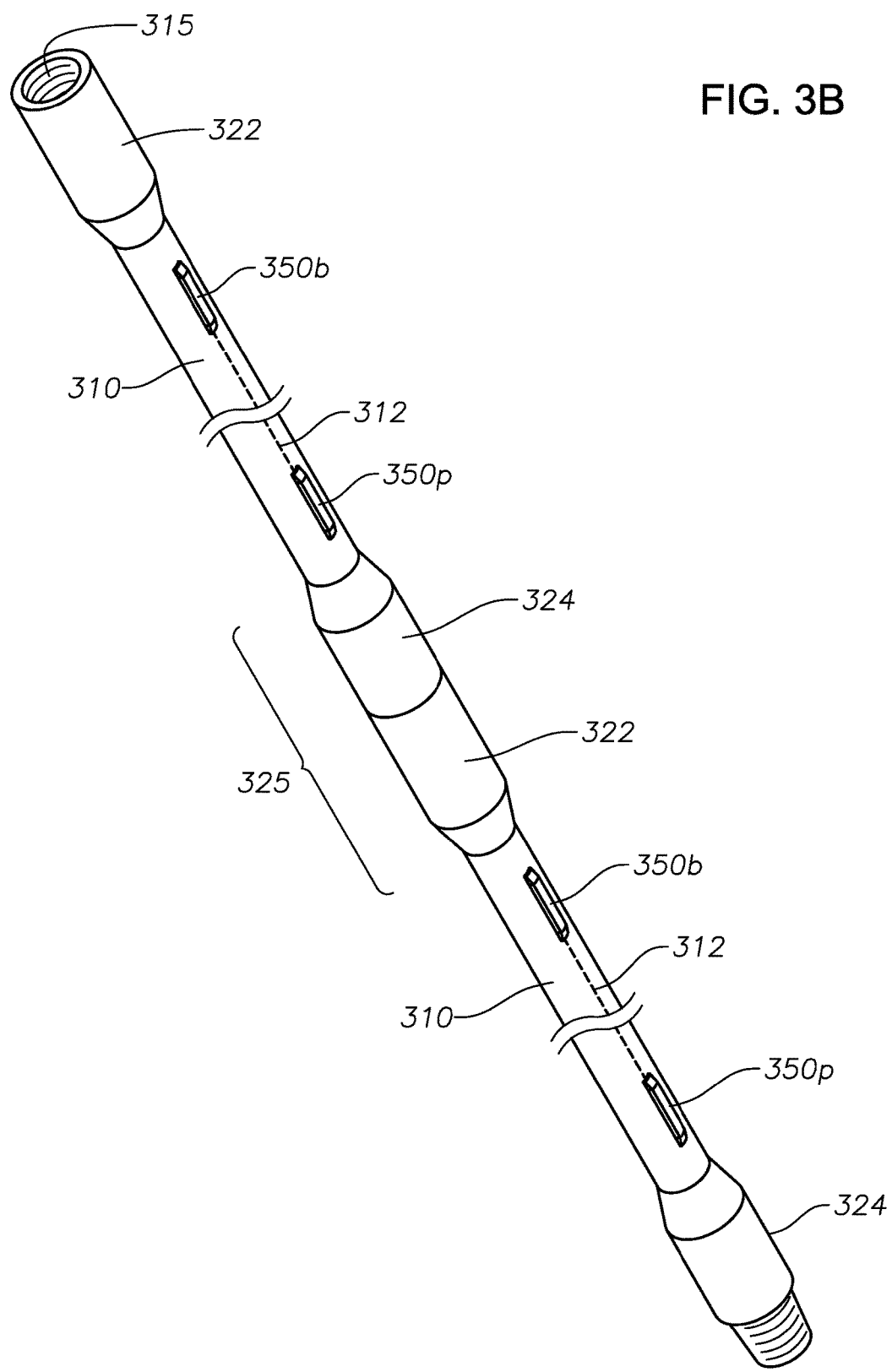
FIG. 3B provides a perspective view of two pipe joints from FIG. 3A, having been threadedly connected. The two joints are joined end-to-end at a coupling.

To further demonstrate the operation of the communications nodes 350*p*, 350*b*, FIG. 3B provides a perspective view of two pipe joints 300 from FIG. 3A, having been threadedly connected. The two joints 300 are joined end-to-end at a coupling 325. In this view, it can be seen that the respective box end communications node 350b and pin end communications node 350p on each pipe joint 300 communicate by electrical signals via the conductive wire 312. At the same time, the adjacent pin end communications node 350p and box end communications node 350b at the coupling 325 communicate by acoustic signals.

The communications nodes 350p, 350b are intended to represent the communications nodes 180 of FIG. 1, in one embodiment. The two-way electro-acoustic transducer 354 in each node 180 allows alternating electrical and acoustic signals to be sent from node-to-node, either up the wellbore 150 or down the wellbore 150.

Returning again to FIG. 1, in operation, the sensor communications node 184 is in electrical communication with the sensor 178. This may be by means of a short wire, or by means of wireless communication such as infrared or radio-frequency communication. The sensor communications node 184 is configured to receive signals from the sensor 178, wherein the signals represent a subsurface condition such as temperature, pressure, resistivity or formation data. Preferably, the sensor is contained in the same housing as the sensor communications node 184. Indeed, the sensor may be the same electro-acoustic transducer that enables the telemetry communication.

The sensor communications node 184 transmits signals from the sensor 178 to an adjoining intermediate communications node 180. Where the adjoining intermediate communications node 180 resides on the same joint of pipe, the signals may be electrical signals sent through an embedded, insulated conductive wire 312. Where the adjoining intermediate communications node 180 resides on a separate joint of pipe, the signals may be acoustic signals sent through a coupling 325. Such acoustic waves are preferably at a frequency of between about 50 kHz and 500 kHz.

The signals are received by an intermediate node 180 that is closest to the sensor node 184. That intermediate communications node 180, in turn, will relay the signal on to a next-closest node 180 so that alternating electrical and acoustic signals indicative of the downhole condition are sent from node-to-node. A last intermediate node 180 transmits the signals to the topside communications node 182. Where the last intermediate communications node 180 resides on the same joint of pipe, the signals will be electrical signals sent through an embedded, insulated conductive wire 312. Where the last intermediate communications node 180 resides on a separate joint of pipe, the signals will be acoustic signals sent through a coupling 325.

The well site 100 of FIG. 1 also shows a receiver 190. The receiver 190 comprises a processor 192 that receives signals sent from the topside communications node 182. The signals may be received through a wire (not shown) such as a co-axial cable, a fiber optic cable, a USB cable, or other electrical or optical communications wire. Alternatively, the receiver 190 may receive the signals from the topside communications node 182 wirelessly through a modem, transceiver or other wireless communications link. The receiver 190 preferably receives electrical signals via a so-called Class I, Division I conduit, that is, housing for wiring that is considered acceptably safe in an explosive environment. In some applications, radio, infrared or microwave signals may be utilized.

In any event, the processor 192 may be incorporated into a computer having a screen. The computer may have a separate keyboard 194, as is typical for a desk-top computer, or an integral keyboard as is typical for a laptop or a personal digital assistant. In one aspect, the processor 192 is part of a multi-purpose "smart phone" having specific "apps" and wireless connectivity.

It is noted that data may be sent along the nodes not only from the sensor 178 up to the receiver 190, but also from the receiver 190 down to the sensor 178. This transmission may be of benefit in the event that the operator wishes to make a change in the way the sensor 178 is functioning. This is also of benefit when the sensor 178 is actually another type of device, such as an inflow control device that opens, closes or otherwise actuates in response to a signal from the surface 101.

FIG. 1 demonstrates the use of an electro-acoustic telemetry system in connection with a drilling operation. However, the electro-acoustic telemetry system may also be used for a completed well.

Figure 2:
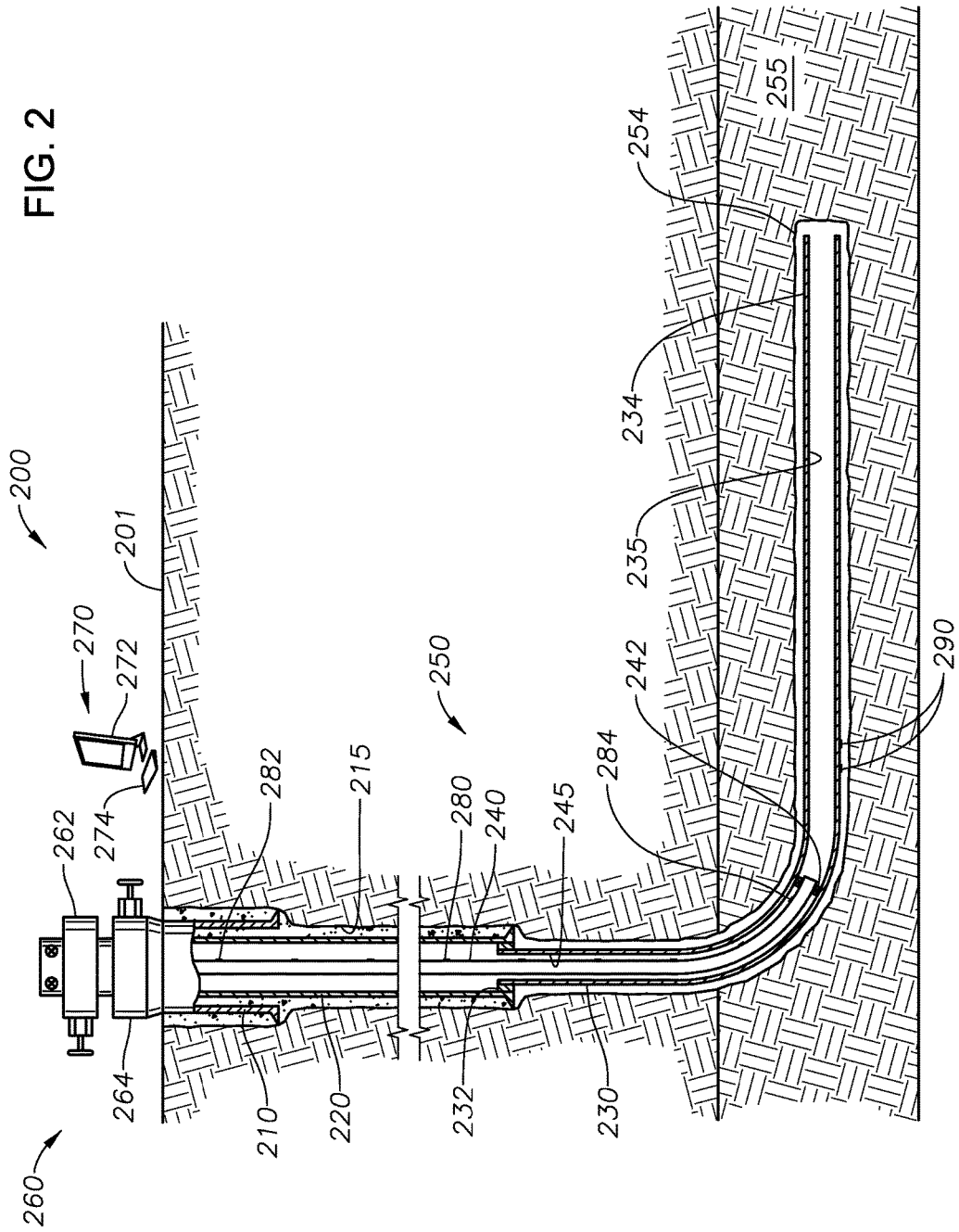
FIG. 2 is a cross-sectional view of a wellbore having been completed. The illustrative wellbore has been completed as a cased hole completion. A series of communications nodes is placed along a tubing string as part of a telemetry system.

FIG. 2 is a cross-sectional view of an illustrative well site 200. The well site 200 includes a wellbore 250 that penetrates into a subsurface formation 255. The wellbore 250 has been completed as a cased-hole completion for producing hydrocarbon fluids. The well site 200 also includes a well head 260. The well head 260 is positioned at an earth surface 201 to control and direct the flow of formation fluids from the subsurface formation 255 to the surface 201.

Referring first to the well head 260, the well head 260 may be any arrangement of pipes or valves that receive reservoir fluids at the top of the well. In the arrangement of FIG. 2, the well head 260 is a so-called Christmas tree. A Christmas tree is typically used when the subsurface formation 255 has enough in situ pressure to drive production fluids from the formation 255, up the wellbore 250, and to the surface 201. The illustrative well head 260 includes a top valve 262 and a bottom valve 264. In some contexts, these valves are referred to as "master valves."

It is understood that rather than using a Christmas tree, the well head 260 may alternatively include a motor (or prime mover) at the surface 201 that drives a pump. The pump, in turn, reciprocates a set of sucker rods and a connected positive displacement pump (not shown) downhole. The pump may be, for example, a rocking beam unit or a hydraulic piston pumping unit. Alternatively still, the well head 260 may be configured to support a string of production tubing having a downhole electric submersible pump, a gas lift valve, or other means of artificial lift (not shown). The present inventions are not limited by the configuration of pumping equipment unless expressly noted in the claims.

Referring next to the wellbore 250, the wellbore 250 has been completed with a series of pipe strings, referred to as casing. First, a string of surface casing 210 has been cemented into the formation. Cement is shown in an annular bore 215 of the wellbore 250 surrounding the casing 210. The surface casing 210 has an upper end in sealed connection with the lower master valve 264.

Next, at least one intermediate string of casing 220 is cemented into the wellbore 250. The intermediate string of casing 220 is in sealed fluid communication with the upper master valve 262. Cement is again shown in a bore 215 of the wellbore 250. The combination of the casing strings 210, 220 and the cement sheath in the bore 215 strengthens the wellbore 250 and facilitates the isolation of formations behind the casing 210, 220.

It is understood that a wellbore 250 may, and typically will, include more than one string of intermediate casing. Some of the intermediate casing strings may be only partially cemented into place, depending on regulatory requirements and the presence of migratory fluids in any adjacent strata. In some instances, an intermediate string of casing may be a liner.

Finally, a production string 230 is provided. The production string 230 is hung from the intermediate casing string 230 using a liner hanger 232. The production string 230 is a liner that is not tied back to the surface 101. A portion of the production liner 230 may optionally be cemented in place.

The production liner 230 has a lower end 234 that extends substantially to an end 254 of the wellbore 250. For this reason, the wellbore 250 is said to be completed as a cased-hole well. Those of ordinary skill in the art will understand that for production purposes, the liner 230 may be perforated or may include sections of slotted liner to create fluid communication between a bore 235 of the liner 230 and the surrounding rock matrix making up the subsurface formation 255. In one aspect, the production string 230 is not a liner but is a casing string that extends back to the surface.

As an alternative, portions of the liner 230 may include joints of sand screen (not shown). The use of sand screens with gravel packs allows for greater fluid communication between the bore 235 of the liner 230 and the surrounding rock matrix while still providing support for the wellbore 250. The present inventions are not limited by the nature of the completion unless expressly so stated in the claims.

The wellbore 250 optionally includes a string of production tubing 240. The production tubing 240 extends from the well head 260 down to the subsurface formation 255. In the arrangement of FIG. 2, the production tubing 240 terminates proximate an upper end of the subsurface formation 255. A production packer 242 is provided at a lower end of the production tubing 240 to seal off an annular region 245 between the tubing 240 and the surrounding production liner 230. However, the production tubing 240 may extend closer to the end 234 of the liner 230.

In some completions a production tubing 240 is not employed. This may occur, for example, when a monobore is in place.

It is also noted that the bottom end 234 of the production string 230 is completed substantially horizontally within the subsurface formation 255. This is a common orientation for wells that are completed in so-called "tight" or "unconventional" formations. However, the present inventions have equal utility in vertically completed wells or in multi-lateral deviated wells. Further, the communications nodes themselves may be used in other tubular constructions such as above-ground, under-ground, or below water pipelines.

The illustrative well site 200 also includes one or more sensors 290. Here, the sensors 290 are placed at the depth of the subsurface formation 255. The sensors 290 may be, for example, pressure sensors, or temperature sensors. A pressure sensor may be, for example, a sapphire gauge or a quartz gauge. Sapphire gauges are preferred as they are considered more rugged for the high-temperature downhole environment. Alternatively, the sensors may be microphones for detecting ambient noise, or geophones (such as a tri-axial geophone) for detecting the presence of micro-seismic activity. Alternatively still, the sensors may be fluid flow measurement devices such as a spinners, or fluid composition sensors.

It is desirable to send signals about the downhole condition back to an operator at the surface 201. As with the well site 100 of FIG. 1, the well site 200 of FIG. 2 includes a telemetry system that utilizes a series of novel communications nodes. Here, the communications nodes are placed along the outer diameter of the string of production tubing 240. These nodes allow for the high speed transmission of wireless signals based on the in situ generation of acoustic waves.

The nodes first include a topside communications node 282. The topside communications node 282 is placed closest to the surface 201. The topside node 282 is configured to receive and/or transmit signals.

The nodes also include a sensor communications node 284. The sensor communications node 284 is placed closest to the sensor 290. The sensor communications node 284 is configured to communicate with the downhole sensor 290, and then send a signal up the wellbore 250. Preferably, the sensors reside within a housing of the sensor communications nodes 284. In one aspect, the sensor is an electro-acoustic transducer in the housing.

Finally, the nodes include a plurality of intermediate communications nodes 280. Each of the intermediate communications nodes 280 resides between the sensor communications node 284 and the topside communications node 282. The intermediate communications nodes 280 are configured to receive and then relay alternative electrical and acoustic signals along the length of the tubing string 240. The intermediate communications nodes 280 utilize transceivers to receive and relay electrical signals (through a conductive wire, such as wire 312 of FIG. 3B) and acoustic signals through the production tubing 240 (such as through the coupling 325, also of FIG. 3B).

In operation, the sensor communications node 284 is in electrical communication with the (one or more) sensors 290. This may be by means of a short wire, or by means of wireless communication such as infrared or radio waves. The sensor communications node 284 is configured to receive signals from the sensors 290, wherein the signals represent a subsurface condition such as temperature or pressure. Alternatively, sensor 290 may be contained in the housing of a communications node 280.

The sensor communications node 284 transmits signals from the sensors 290 to a lowermost intermediate communications node 280. Where the sensor communications node 284 and the lowermost intermediate communications node 280 reside on the same joint of pipe, the signals will be electrical signals sent through an embedded, insulated conductive wire 312. Where the sensor communications node 280 resides on a separate joint of pipe, the signals will be sent acoustically through a coupling 325. The acoustic waves are preferably at a frequency of between about 50 kHz and 500 kHz. More preferably, the acoustic wave are transmitted at a frequency of between about 100 kHz and 125 kHz.

The signals are received by the intermediate communications node 280 that is closest to the sensor node 284. That intermediate communications node 280, in turn, will relay the signal on to a next-closest node 280 so that alternating electrical and acoustic signals indicative of the downhole condition are sent from node-to-node. A last intermediate node 280 transmits the signals to the topside node 282, which in turn sends signals on to a receiver 270.

The well site 200 of FIG. 2 shows a receiver 270. The receiver 270 comprises a processor 272 that receives signals sent from the topside communications node 284. The receiver 270 may include a screen and a keyboard 274 (either as a keypad or as part of a touch screen). The receiver 270 may also be an embedded controller with neither screen nor keyboard which communicates with a remote computer via cellular modem or telephone lines.

The signals may be received by the processor 272 through a wire (not shown) such as a co-axial cable, a fiber optic cable, a USB cable, or other electrical or optical communications wire. Alternatively, the receiver 270 may receive the final signals from the topside node 282 wirelessly through a modem or transceiver. The receiver 270 preferably receives electrical signals via a so-called Class I, Division I conduit, that is, a wiring conduit that is considered acceptably safe in an explosive environment.

FIGS. 1 and 2 present illustrative wellbores 150, 250 having a downhole telemetry system that uses a series of electro-acoustic transducers and associated transceivers. In each of FIGS. 1 and 2, the top of the drawing page is intended to be toward the surface and the bottom of the drawing page toward the well bottom. While wells commonly are completed in substantially vertical orientation, it is understood that wells may also be inclined and even horizontally completed. When the descriptive terms "up" and "down" or "upper" and "lower" or similar terms are used in reference to a drawing, they are intended to indicate location on the drawing page, and not necessarily orientation in the ground, as the present inventions have utility no matter how the wellbore is orientated.

In each of FIGS. 1 and 2, the communications nodes 180, 280 are specially designed to withstand the same corrosion and environmental conditions (i.e., high temperature, high pressure) of a wellbore 150 or 250 as the casing strings, drill string, or production tubing. To do so, it is preferred that the communications nodes 180, 280 include sealed steel housings for holding the electronics.

Figure 4A:
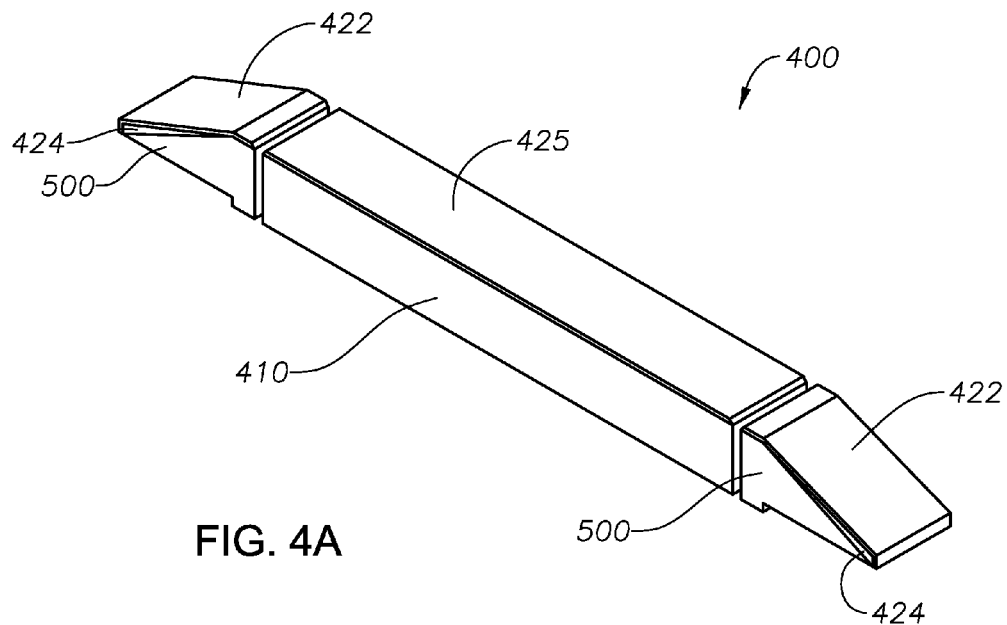
FIG. 4A is a perspective view of a communications node as may be used in the electro-acoustical data transmission system of the present invention, in an alternate embodiment.

FIG. 4A is a perspective view of a communications node 400 as may be used in the wireless data transmission systems of FIG. 1 or FIG. 2, in one embodiment. The intermediate communications node 400 is designed to provide two-way communication using a transceiver within a novel downhole housing assembly. FIG. 4B is a cross-sectional view of the communications node 400 of FIG. 4A. The view is taken along the longitudinal axis of the node 400. The communications node 400 will be discussed with reference to FIGS. 4A and 4B, together.

The communications node 400 first includes a housing 410. The housing 410 is designed to be attached to an outer wall of a joint of wellbore pipe, such as the pipe joint 300 of FIG. 3. Where the wellbore pipe is a carbon steel pipe joint such as drill pipe, casing or liner, the housing is preferably fabricated from carbon steel. This metallurgical match avoids galvanic corrosion at the coupling.

The housing 410 is dimensioned to be strong enough to protect internal electronics. In one aspect, the housing 410 has an outer wall 412 that is about 0.2 inches (0.51 cm) in thickness. A bore 405 is formed within the wall 412. The bore 405 houses the electronics, shown in FIG. 4B as a battery 430, a power supply wire 435, a transceiver 440, and a circuit board 445. The circuit board 445 will preferably include a micro-processor or electronics module that processes acoustic signals. An electro-acoustic transducer 442 is provided to convert acoustical energy to electrical energy (or vice-versa) and is coupled with outer wall 412 on the side attached to the tubular body. The transducer 442 is in electrical communication with a sensor 432.

It is noted that in FIG. 4B, the sensor 432 resides within the housing 410 of the communications node 400. However, as noted, the sensor 432 may reside external to the communications node 400, such as above or below the node 400 along the wellbore. In FIG. 4C, a dashed line is provided showing an extended connection between the sensor 432 and the electro-acoustic transducer 442.

Where the communications node 400 is a box end communications node 350b (and where the signals are being sent up the wellbore), the transceiver 440 will receive acoustic signals from an adjacent pin end communications node 350p. Those acoustic signals will be digitized by the microprocessor. This may involve carrying the acoustic signals through a signal conditioning circuit using, for example, a bandpass filter.

In one preferred embodiment, the acoustic telemetry data transfer is accomplished using multiple frequency shift keying (MFSK). Any extraneous noise in the signal is moderated by using well-known conventional analog and/or digital signal processing methods. This noise removal and signal enhancement may involve conveying the acoustic signal through a signal conditioning circuit using, for example, a bandpass filter.

The transceiver will also produce acoustic telemetry signals. In one preferred embodiment, an electrical signal is delivered to an electromechanical transducer, such as through a driver circuit. In a preferred embodiment, the transducer is the same electro-acoustic transducer that originally received the MFSK data. The signal generated by the electro-acoustic transducer then passes through the housing 410 to the tubular body (such as production tubing 240), and propagates along the tubular body to other communication nodes. The re-transmitted signal represents the same sensor data originally transmitted by sensor communications node 284. In one aspect, the acoustic signal is generated and received by a magnetostrictive transducer comprising a coil wrapped around a core as the transceiver. In another aspect, the acoustic signal is generated and received by a piezo-electric ceramic transducer. In either case, the filtered signal is delivered to a pin end communications node 350p on the same joint of pipe 300 using the conductive wire 312.

Where the communications node 400 is a pin end communications node 350p (and where the signals are being sent up the wellbore), the transceiver 440 will receive the electric signals from the box end communications node 350p on the same joint of pipe 300. Those electrical signals will be converted into acoustic signals. The acoustic signals may be serially encoded and then delivered to a pin end communications node 350p on an adjacent joint of pipe 300 through the coupling 325. In one aspect, the acoustic signal is generated by a magnetostrictive transducer comprising a coil wrapped around a core as the transceiver. In another aspect, the acoustic signal is generated and received by a piezo-electric ceramic transducer. In either case, the electrically encoded data are transformed into a sonic wave that is carried through the wall of the tubular body in the wellbore.

The communications node 400 optionally has a protective outer layer 425. The protective outer layer 425 reside external to the wall 412 and provides an additional thin layer of protection for the electronics. The communications node 400 is also preferably fluid-sealed within the housing 410 to protect the internal electronics. Additional protection for the internal electronics is available using an optional potting material.

The communications node 400 also optionally includes a shoe 500. More specifically, the node 400 includes a pair of shoes 500 disposed at opposing ends of the wall 412. Each of the shoes 500 provides a beveled face that helps prevent the node 400 from hanging up on an external tubular body or the surrounding earth formation, as the case may be, during run-in or pull-out. The shoes 500 may have a protective outer layer 422 and an optional cushioning material 424 (shown in FIG. 4A) under the outer layer 422.

Figure 5A:
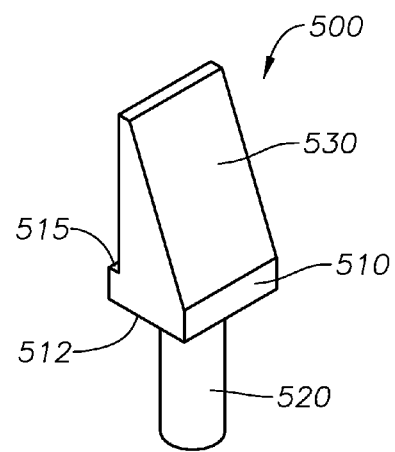
FIGS. 5A and 5B are perspective views of a shoe as may be used on opposing ends of the communications node of FIG. 4A, in one embodiment.
Figure 5B:
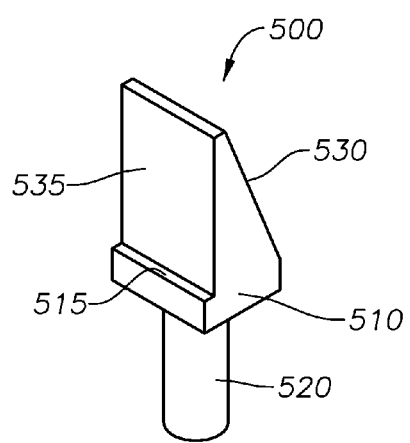

FIGS. 5A and 5B are perspective views of an illustrative shoe 500 as may be used on an end of the communications node 400 of FIG. 4A, in one embodiment. In FIG. 5A, the leading edge or front of the shoe 500 is seen, while in FIG. 4B the back of the shoe 500 is seen.

The shoe 500 first includes a body 510. The body 510 includes a flat under-surface 512 that butts up against opposing ends of the wall 412 of the communications node 400.

Extending from the under-surface 512 is a stem 520. The illustrative stem 520 is circular in profile. The stem 520 is dimensioned to be received within opposing recesses 414 of the wall 412 of the node 400.

Extending in an opposing direction from the body 510 is a beveled surface 530. As noted, the beveled surface 530 is designed to prevent the communications node 400 from hanging up on an object during run-in into a wellbore.

Behind the beveled surface 530 is a flat surface 535. The flat surface 535 is configured to extend along the drill string 160 (or other tubular body) when the communications node 400 is attached to the tubular body 300. In one aspect, the shoe 500 includes an optional shoulder 515. The shoulder 515 creates a clearance between the flat surface 535 and the tubular body opposite the stem 520.

In one arrangement, the communications nodes 400 with the shoes 500 are welded onto an inner or outer surface of the tubular body, such as wall 310 of the pipe joint 300. More specifically, the body 410 of the respective communications nodes 400 are welded onto the wall of the tubular body. In some cases, it may not be feasible or desirable to pre-weld the communications nodes 400 onto pipe joints before delivery to a well site. Further still, welding may degrade the tubular integrity or damage electronics in the housing 410. Therefore, it is desirable to utilize a clamping system that allows a drilling or service company to mechanically connect/disconnect the communications nodes 400 along a tubular body as the tubular body is being run into a wellbore.

Figure 6:
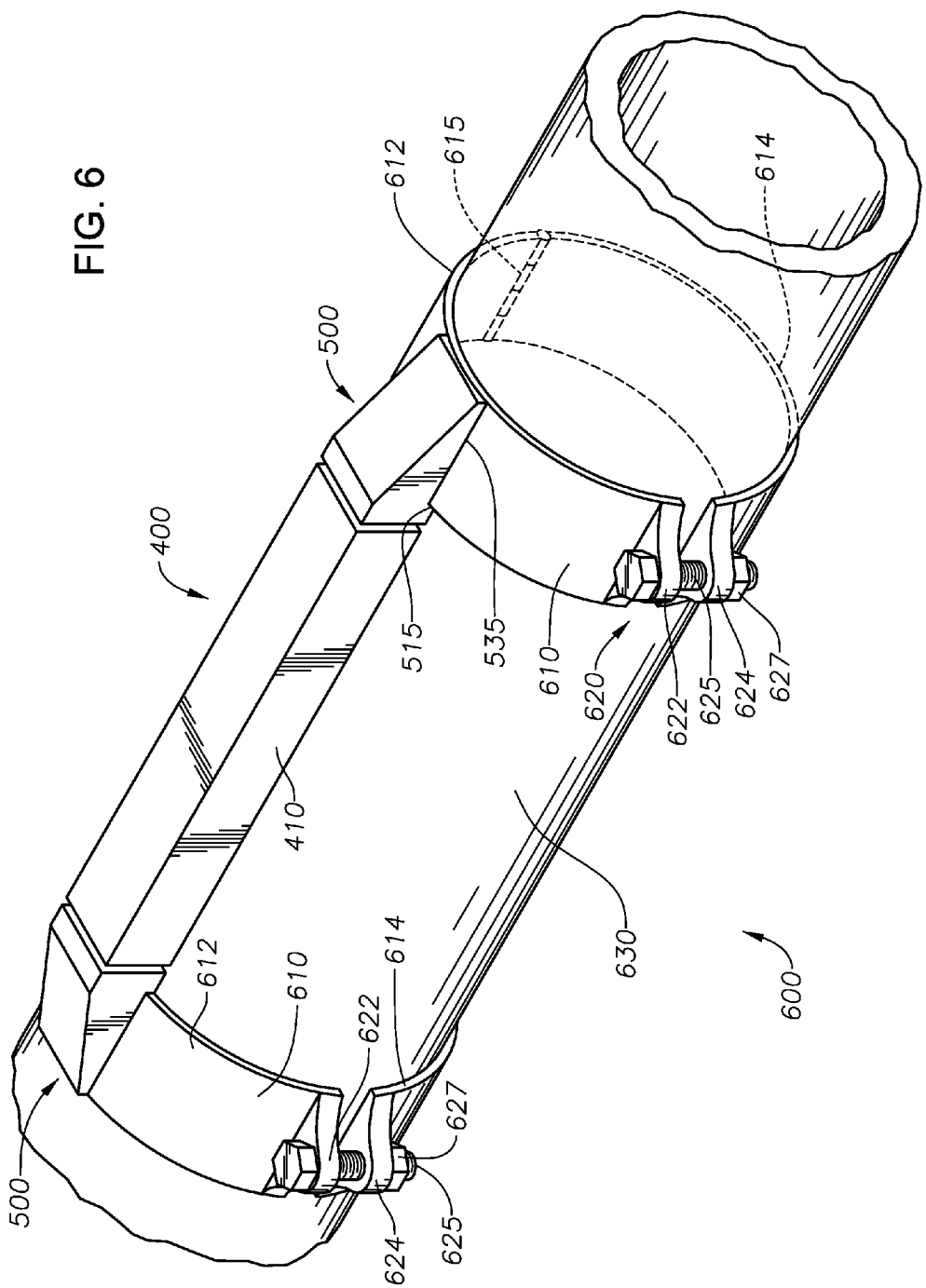
FIG. 6 is a perspective view of a portion of a communications node system of the present invention, in one embodiment. The communications node system utilizes a pair of clamps for connecting a communications node onto a tubular body.

FIG. 6 is a perspective view of a portion of a communications node system 600 of the present invention, in one embodiment. The communications node system 600 utilizes a pair of clamps 610 for mechanically connecting a communications node 400 onto a tubular body 630.

The system 600 first includes at least one clamp 610. In the arrangement of FIG. 6, a pair of clamps 610 is used. Each clamp 610 abuts the shoulder 515 of a respective shoe 500. Further, each clamp 610 receives the base 535 of a shoe 500. In this arrangement, the base 535 of each shoe 500 is welded onto an outer surface of the clamp 610. In this way, the clamps 610 and the communications node 400 become an integral tool.

The illustrative clamps 610 of FIG. 6 include two arcuate sections 612, 614. The two sections 612, 614 pivot relative to one another by means of a hinge. Hinges are shown in phantom at 615. In this way, the clamps 610 may be selectively opened and closed.

Each clamp 610 also includes a fastening mechanism 620. The fastening mechanisms 620 may be any means used for mechanically securing a ring onto a tubular body, such as a hook or a threaded connector. In the arrangement of FIG. 6, the fastening mechanism is a threaded bolt 625. The bolt 625 is received through a pair of rings 622, 624. The first ring 622 resides at an end of the first section 612 of the clamp 610, while the second ring 624 resides at an end of the second section 614 of the clamp 610. The threaded bolt 625 may be tightened by using, for example, one or more washers (not shown) and threaded nuts 627.

In operation, a clamp 610 is placed onto the tubular body 630 by pivoting the first 612 and second 614 arcuate sections of the clamp 610 into an open position. The first 612 and second 614 sections are then closed around the tubular body 630, and the bolt 625 is run through the first 622 and second 624 receiving rings. The bolt 625 is then turned relative to the nut 627 in order to tighten the clamp 610 and connected communications node 400 onto the outer surface of the tubular body 630. Where two clamps 610 are used, this process is repeated.

The tubular body 630 may be, for example, a drill string such as the illustrative drill string 160 of FIG. 1. Alternatively, the tubular body 630 may be a string of production tubing such as the tubing 240 of FIG. 2. In any instance, the wall 412 of the communications node 400 is ideally fabricated from a steel material having a resonance frequency compatible with the resonance frequency of the tubular body 630. In addition, the mechanical resonance of the wall 412 is at a frequency contained within the frequency band used for telemetry.

In one aspect, the communications node 400 is about 12 to 16 inches (0.30 to 0.41 meters) in length as it resides along the tubular body 630. Specifically, the housing 410 of the communications node may be (0.20 to 0.25 meters) in length, and each opposing shoe 500 may be 2 to 5 inches (0.05 to 0.13 meters) in length. Further, the communications node 400 may be about 1 inch in width and 1 inch in height. The housing 410 of the communications node 400 may have a concave profile that generally matches the radius of the tubular body 630.

A method for transmitting data in a wellbore is also provided herein. The method preferably employs the communications node 400 and the clamps 610 of FIG. 6.

Figure 7:
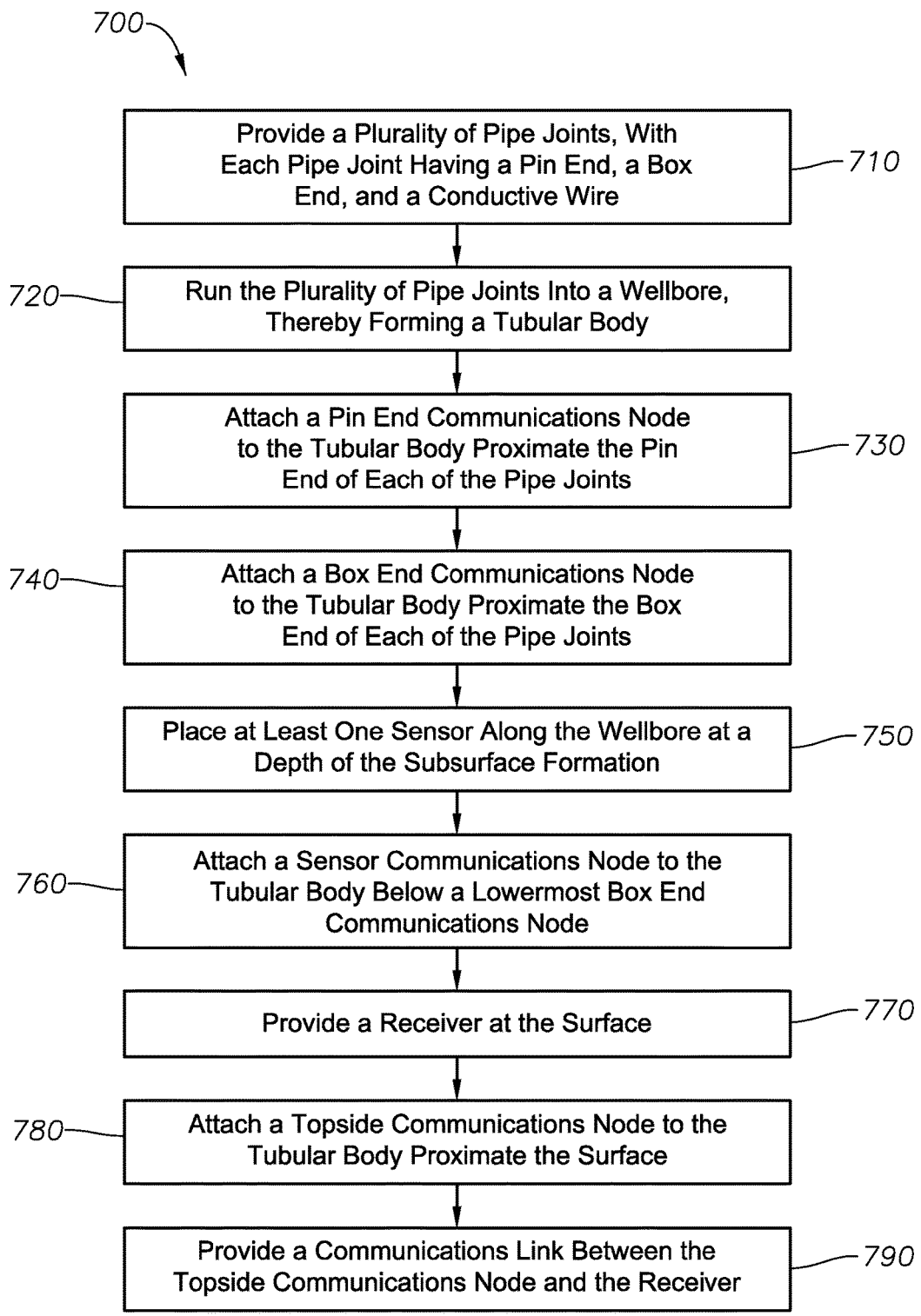
FIG. 7 is a flowchart demonstrating steps of a method for transmitting data in a wellbore in accordance with the present inventions, in one embodiment.

FIG. 7 provides a flow chart for a method 700 of transmitting date in a wellbore. The method 700 uses a plurality of communications nodes situated along a tubular body to accomplish a hybrid wired-and-wireless transmission of data along the wellbore. The wellbore penetrates into a subsurface formation, allowing for the communication of a wellbore condition at the level of the subsurface formation up to the surface.

The method 700 first includes providing a plurality of pipe joints. This is shown at Box 710. Each joint of pipe has a pin end, a box end, and a conductive wire that extends substantially from the pin end to the box end.

The method 700 also includes running the plurality of pipe joints into a wellbore. This is provided at Box 720. The plurality of pipe joints are threadedly connected at couplings, thereby forming a tubular body within the wellbore.

The method 700 further includes attaching a pin end communications node to the tubular body. This is indicated at Box 730. The pin end connection nodes are attached to an external surface of the tubular body proximate the pin end of each joint of pipe.

The method 700 additionally includes attaching a box end communications node to the tubular body. This is indicated at Box 740. The pin end connection nodes are also attached to an external surface of the tubular body, but they are attached proximate the box end of each joint of pipe.

In one aspect, the tubular body is a drill string. In this instance, each of the communications nodes is preferably placed along an outer diameter of pipe joints making up the drill string. In another aspect, the tubular body is a casing string. In this instance, each of the communications nodes is placed along an outer surface of pipe joints making up the casing string. In yet another embodiment, the tubular body is a production string such as tubing. In this instance, each of the communications nodes may be placed along an outer diameter of pipe joints making up the production string.

The method 700 also includes placing at least one sensor along the wellbore. This is provided at Box 750. The sensor is placed at a depth of the subsurface formation. The sensor may be a pressure sensor, a temperature sensor, an inclinometer, a logging tool, a resistivity sensor, or other sensor. The sensor may reside, for example, along a string of drill pipe as part of a rotary steerable drilling system. Alternatively, the sensor may reside along a string of casing within a wellbore. Alternatively still, the sensor may reside along a string of production tubing. The sensor may be within a communications node.

The method 700 further includes attaching a sensor communications node to the tubular body. This is seen at Box 760. The sensor communications node is placed below a lowermost box end communications node. The sensor communications node is in electrical communication with the at least one sensor. This is preferably a short wired connection. The sensor communications node is configured to receive signals from the at least one sensor. The signals represent a subsurface condition such as temperature, pressure, pipe strain or geology.

The method 700 additionally includes providing a receiver. This is seen at Box 770. The receiver is positioned at the surface, such as proximate a wellhead or on an offshore platform.

The method 700 also provides for attaching a topside communications node to the tubular body. This is indicated at Box 780. The topside communications node is attached to the tubular body proximate the surface. This may mean that the topside communications node is attached to the well head in a cellar or above grade.

Still further, the method 700 includes providing a communications link. This is shown at Box 790. The link is placed between the topside communications node and the receiver. The link may be, for example, an electrical conduit or cable that meets Class I, Division I requirements.

It is noted that the communications nodes are configured to transmit and receive electrical signals representing the subsurface condition along the conductive wire in each pipe joint. This means that each pin end communications node and each corresponding box end communications node are in electrical communication by means of the conductive wire along the corresponding joint of pipe.

In addition, the communications nodes are configured to transmit and receive acoustic signals. The signals are sent across pipe couplings using the steel material of the tubular body as the transmission medium. In one aspect, piezo wafers or other piezoelectric elements are used to transmit the acoustic signals. In another aspect, multiple stacks of piezoelectric crystals or other magnetostrictive devices are used. Signals are created by applying electrical signals of an frequency across one or more piezoelectric crystals, causing them to vibrate at a rate corresponding to the frequency of the desired acoustic signal.

In the method 700, each of the pin end and box end communications nodes has an independent power source. The independent power source may be, for example, batteries or a fuel cell. In addition, each of the pin end and box end communications nodes has an electro-acoustic transceiver for sending and receive acoustic waves. Preferably, a frequency would be selected that is between about 100 kHz and 125 kHz to more closely match the anticipated resonance frequency of the pipe material itself In one aspect, the data transmitted between the nodes is represented by acoustic waves according to a multiple frequency shift keying (MFSK) modulation method. Although MFSK is well-suited for this application, its use as an example is not intended to be limiting. It is known that various alternative forms of digital data modulation are available, for example, frequency shift keying (FSK), multi-frequency signaling (MF), phase shift keying (PSK), pulse position modulation (PPM), and on-off keying (OOK). In one embodiment, every 4 bits of data are represented by selecting one out of sixteen possible tones for broadcast.

Acoustic telemetry along tubulars is characterized by multi-path or reverberation which persists for a period of milliseconds. As a result, a transmitted tone of a few milliseconds duration determines the dominant received frequency for a time period of additional milliseconds. Preferably, the communication nodes determine the transmitted frequency by receiving or "listening to" the acoustic waves for a time period corresponding to the reverberation time, which is typically much longer than the transmission time. The tone duration should be long enough that the frequency spectrum of the tone burst has negligible energy at the frequencies of neighboring tones, and the listening time must be long enough for the multipath to become substantially reduced in amplitude. In one embodiment, the tone duration is 2 ms, then the transmitter remains silent for 48 milliseconds before sending the next tone. The receiver, however, listens for 2+48=50 ms to determine each transmitted frequency, utilizing the long reverberation time to make the frequency determination more certain. Beneficially, the energy required to transmit data is reduced by transmitting for a short period of time and exploiting the multi-path to extend the listening time during which the transmitted frequency may be detected.

In one embodiment, an MFSK modulation is employed where each tone is selected from an alphabet of 16 tones, so that it represents 4 bits of information. With a listening time of 50 ms, for example, the data rate is 80 bits per second.

The tones are selected to be within a frequency band where the signal is detectable above ambient and electronic noise at least two nodes away from the transmitter node so that if one node fails, it can be bypassed by transmitting data directly between its nearest neighbors above and below. In one example the tones are evenly spaced in period within a frequency band from about 50 kHz to 500 kHz. In another example, the tones are evenly spaced in frequency within a frequency band from about 100 kHz to 125 kHz.

Alternating electrical and acoustic signals are sent up the wellbore pipe using the communications nodes. In this way, signals may be sent from the sensor up to the topside communications node in node-to-node arrangement. In one aspect, the communications nodes transmit data at a rate exceeding about 50 bps.

Once the signals reach the topside communications node, a new signal is transmitted to the receiver at the surface. This effectuates the step of Box 790. The signal may be either a wired or a wireless electrical signal. Alternatively, the signal may be an optical signal. In any instance, the signal represents a subsurface condition as originally transmitted by the sensor in the subsurface formation.

The signals are received by the receiver, which has data acquisition capabilities. The receiver may employ either volatile or non-volatile memory. These signals may then be processed and analyzed by an operator or by software or both.

In an alternate arrangement for the method 700 herein, the communications nodes are embedded in a cavity within the threaded pipe couplings. Thus, the pin end communications nodes would be embedded in cavities within the pin end, while the box end communications nodes would be embedded in cavities within the box end.

As can be seen, a novel downhole telemetry system is provided, as well as a novel method for the electro-acoustic transmission of information using a plurality of data transmission nodes.

While it will be apparent that the inventions herein described are well calculated to achieve the benefits and advantages set forth above, it will be appreciated that the inventions are susceptible to modification, variation and change without departing from the spirit thereof.

What is claimed is:

1. A method of transmitting data along a wellbore, comprising:
   providing a sensor along the wellbore proximate a depth of a subsurface formation;
   running joints of pipe into the wellbore, the joints of pipe being connected at threaded couplings;
   providing a series of communications nodes spaced along the joints of pipe, wherein the communications nodes are configured to communicate (i) with an adjacent communications node on a same joint of pipe by means of a conductive wire embedded into the joints of pipe, and (ii) with an adjacent communications node on a connected joint of pipe by means of an acoustic signal transmitted across threaded pipe couplings;
   providing a receiver at a surface; and
   sending signals from the sensor to the receiver via the series of communications nodes, node-to-node, with the signals being indicative of a subsurface condition.

2. The method of claim 1, wherein:
   the surface is an earthen surface; and
   the pipe is a pipe residing at least one of above the earthen surface and below the earthen surface.

3. The method of claim 1, wherein:
   the surface is a water surface; and
   the pipe is a pipe residing at least one of above the water surface and below the water surface.

4. The method of claim 1, wherein each of the communications nodes comprises:
   a housing;
   an electro-acoustic transducer and associated transceiver residing within the housing; and
   an independent power source also residing within the housing for providing power to the transceiver.

5. The method of claim 4, wherein the joints of pipe form a string of drill pipe, a string of casing, a string of production tubing, or a string of injection tubing.

6. The method of claim 1, wherein the sensor is (i) a pressure sensor, (ii) a temperature sensor, (iii) an induction log, (iv) a gamma ray log, (v) a formation density sensor, (vi) a sonic velocity sensor, (vii) a vibration sensor, (viii) a resistivity sensor, (ix) a flow meter, (x) a microphone, (xi) a geophone, or (xii) a set of position sensors.

7. The method of claim 1, wherein each of the communications nodes further comprises at least one clamp for radially attaching the communications node onto an outer surface of a joint of pipe.

8. The method of claim 7, wherein the at least one clamp comprises:
   a first arcuate section;
   a second arcuate section;
   a hinge for pivotally connecting the first and second arcuate sections; and
   a fastening mechanism for securing the first and second arcuate sections around an outer surface of the tubular body.

9. The method of claim 1, wherein:
   the electro-acoustic transceivers receive acoustic waves at a first frequency, and re-transmit the acoustic waves at a second different frequency; and
   the electro-acoustic transceivers listen for the acoustic waves generated at the first frequency for a longer time than the time for which the acoustic waves were generated at the first frequency by a previous communications node.

10. The electro-acoustic system of claim 1, wherein the sensor resides in the housing of a communications node.

11. A downhole acoustic telemetry system, comprising:
    a tubular body having a pin end, a box end, and an elongated wall between the pin end and the box end, with the tubular body being fabricated from a steel material having a resonance frequency;
    a pin end communications node secured to an outer surface of the tubular body proximate the pin end;
    a box end communications node secured to an outer surface of the tubular body proximate the box end; and
    a conductive wire provided along the elongated wall placing the communications nodes in electrical communication;
    wherein each of the communications nodes comprises: a housing having a sealed bore, with the housing being fabricated from a material having a resonance frequency that is within the frequency band used for the acoustic signals;
    an electro-acoustic transducer and associated transceiver residing within the bore for communicating with an adjacent communications node along the tubular body using electrical signals carried through the conductive wire, and the transceiver being configured to send acoustic signals across joint couplings that correlate to the electrical signals; and an independent power source residing within the bore providing power to the transceiver.

12. The acoustic telemetry system of claim 11, wherein the tubular body is a joint of drill pipe, a joint of casing, a joint of production tubing, or a joint of a liner string.

13. The acoustic telemetry system of claim 11, wherein each of the communications nodes further comprises at least one clamp for radially clamping the communications node onto an outer surface of the tubular body.

14. The acoustic telemetry system of claim 13, wherein the at least one clamp comprises:
    a first arcuate section;
    a second arcuate section;
    a hinge for pivotally connecting the first and second arcuate sections; and
    a fastening mechanism for securing the first and second arcuate sections around the outer surface of the tubular body.

15. The acoustic telemetry system of claim 14, wherein:
    the housing of the communications node comprises a first end and a second opposite end; and
    the at least one clamp comprises a first clamp secured at the first end of the housing, and a second clamp secured at the second end of the housing.

16. The acoustic telemetry system of claim 15, wherein:
    each of the communications nodes further comprises a first shoe at the first end of the housing and a second shoe at the second end of the housing;
    the first shoe and the second shoe each comprises:
    a beveled edge designed to face away from the tubular body, a flat surface designed to face towards the tubular body, and a shoulder providing a clearance between the flat surface and the tubular body configured to receive a clamp.

17. The acoustic telemetry system of claim 16, wherein the flat surface of each shoe is welded onto the first arcuate section of a respective clamp.

18. The acoustic telemetry system of claim 12, wherein:
the tubular body defines a first tubular body;
the first tubular body is threadedly connected to a second tubular body, with the second tubular body also having a pin end, a box end, and an elongated wall between the pin end and the box end;
the second tubular body also has a pin end communications node and a box end communications node; and
the pin end communications node of the second tubular body is adjacent to and in acoustic communication with the box end communications node of the first tubular body.

19. The acoustic telemetry system of claim 18, wherein:
the transceiver in the pin end communications node of the second tubular body is designed to (i) receive acoustic waves from the box end communications node secured to the first tubular body through the steel material of the first and second tubular bodies, (ii) convert the acoustic waves into electrical signals, and (iii) transmit the electrical signals to the box end communications node on the second tubular body; and
the transceiver in the box end communications node of the first tubular body is designed to (i) receive electrical signals from the transceiver in the pin end communications node of the first tubular body through the conductive wire, (ii) convert the electrical signals into acoustic waves, and (iii) transmit the acoustic waves through the steel material of the first and second tubular bodies to the transceiver of the pin end in the second tubular body.

20. The acoustic telemetry system of claim 19, wherein a frequency band for the acoustic wave transmission operates from 100 kHz to 125 kHz.

21. The acoustic telemetry system of claim 20, wherein the acoustic waves are modulated by the intermediate communications nodes according to a multiple frequency shift keying solution.

22. A system for wireless downhole telemetry, comprising:
a tubular body comprised of a plurality of threadedly-connected pipe joints, each pipe joint having (i) a pin end, (ii) an opposing box end, and (iii) an elongated tubular wall;
a pin end communications node secured to an outer surface of the tubular body proximate the pin end of each of the pipe joints;
a box end communications node secured to an outer surface of the tubular body proximate the box end of each of the pipe joints;
at least one sensor disposed along the tubular body; and
a conductive wire provided along the wall of each of the pipe joints, the conductive wire placing the pin end and box end communications nodes of each pipe joint in electrical communication;
wherein each of the communications nodes comprises:
a housing fabricated from a steel material;
a sealed bore within the housing;
an electro-acoustic transducer and associated transceiver residing within the bore for communicating with an adjacent communications node along the tubular body using electrical signals carried through the conductive wire, and configured to send acoustic signals across joint couplings that correlate to the electrical signals; and
an independent power source residing within the bore.

23. The system of claim 22, wherein:
the tubular body is comprised of pipe joints disposed in a wellbore, with the wellbore penetrating into a subsurface formation; and
the at least one sensor is disposed along the wellbore proximate a depth of the subsurface formation.

24. The downhole telemetry system of claim 23, further comprising:
a sensor communications node placed along the wellbore and connected to a wall of a pipe joint at the depth of the subsurface formation, the sensor communications node being in electrical communication with and configured to receive signals from the at least one sensor, with the signals representing a subsurface condition;
a topside communications node placed along the wellbore proximate a surface of the wellbore; and
wherein the sensor communications node is in electro-acoustical communication with the topside communications node by means of the pin end communications nodes, the box end communications nodes, and the conductive wires for each respective joint of pipe.

25. The downhole telemetry system of claim 24, wherein:
the tubular body is a drill string; and
each of the communications nodes is placed along an outer surface of pipe joints making up the drill string.

26. The downhole telemetry system of claim 24, wherein:
the tubular body is a drill string; and
each of the communications nodes is placed within a cavity in the threaded connections making up the drill string.

27. The downhole telemetry system of claim 24, wherein:
the tubular body is a casing string; and
each of the communications nodes is placed along an outer surface of pipe joints making up the casing string.

28. The downhole telemetry system of claim 24, wherein:
the tubular body is a production tubing; and
each of the communications nodes is placed along an outer surface of pipe joints making up the production tubing.

29. The downhole telemetry system of claim 24, wherein:
a well head is placed above the wellbore; and
the topside communications node is disposed on an outer surface of an uppermost joint of the tubular body, or on the well head.

30. The downhole telemetry system of claim 29, further comprising:
a receiver at an earth surface, the receiver being designed to receive a signal from the topside communications node.

31. The downhole telemetry system of claim 30, wherein:
the earth surface is a land surface or an offshore platform; and
the signal is transmitted via a conduit with a wire, or a wireless connection.

32. The downhole telemetry system of claim 22, wherein the at least one sensor comprises (i) a pressure sensor, (ii) a temperature sensor, (iii) an induction log, (iv) a gamma ray log, (v) a formation density sensor, (vi) a sonic velocity sensor, (vii) a vibration sensor, (viii) a resistivity sensor, (ix) a flow meter, (x) a microphone, (xi) a geophone, or (xii) a set of position sensors.

33. The downhole telemetry system of claim 22, wherein each of the communications nodes further comprises at least one clamp for radially clamping the communications node onto an outer surface of the tubular body.

34. A method of transmitting data in a wellbore, comprising:
providing a plurality of pipe joints, each pipe joint having (i) a pin end, (ii) a box end, (iii) a tubular wall, and (iv) a conductive wire placed along the wall extending substantially from the pin end to the box end;
running the plurality of pipe joints into the wellbore by threadedly connecting the respective pin ends and box ends together, thereby forming a tubular body;
attaching a pin end communications node to an outer surface of the tubular body proximate the pin end of each of the pipe joints;
attaching a box end communications node to an outer surface of the tubular body proximate the box end of each of the pipe joints;
placing at least one sensor along the wellbore at a depth of the subsurface formation;
sending an electro-acoustic signal from the sensor and up the wellbore from node-to-node;
wherein each of the communications nodes comprises:
a housing having a sealed bore;
an electro-acoustic transducer and associated transceiver residing within the bore for communicating with an adjacent communications node using electrical signals carried through the conductive wire, and configured to send acoustic signals across joint couplings along the tubular body that correlate to the electrical signals; and
an independent power source residing within the bore.

35. The method of claim 34, further comprising: attaching a sensor communications node to an outer surface of a pipe joint below a lowermost box end communications node, the sensor communications node being in electrical communication with the at least one sensor and configured to (i) receive signals from the at least one sensor, and (ii) transmit those signals to an adjacent communications node; and wherein the signals from the sensor represent a subsurface condition.

36. The method of claim 35, wherein:
the adjacent communications node is a box end communications node;
the sensor communications node is secured to the same pipe joint as the adjacent box end communications node; and
the sensor communications node is in electrical communication with and is configured to receive signals from the adjacent box end communications node through a conductive wire embedded into the pipe joint supporting the sensor communications node.

37. The method of claim 35, wherein:
the adjacent communications node is a pin end communications node;
the sensor communications node is secured to a pipe joint that is separate from the pipe joint supporting the pin end communications node; and
the sensor communications node is configured to receive acoustic signals from the adjacent pin end communications node by means of an acoustic signal sent across a coupling with the separate pipe joint.

38. The method of claim 35, wherein the sensor is located at the depth of the subsurface formation.

39. The method of claim 34, further comprising:
providing a receiver at the surface;
attaching a topside communications node to a wall of the tubular body proximate a surface of the wellbore; and
providing a communications link between the topside communications node and the receiver such that the sensor is in communication with the receiver.

40. The method of claim 39, wherein
sending an electro-acoustic signal from the sensor and up the wellbore from node-to-node also comprises sending a signal from an uppermost communications node to the topside communications node.

41. The method of claim 39, wherein:
the uppermost communications node is a pin end communications node;
the topside communications node is secured to the same pipe joint as the adjacent pin end communications node; and
the uppermost pin end communications node is in electrical communication with the topside communications node through a conductive wire embedded into the pipe joint supporting the topside communications node.

42. The method of claim 39, wherein:
the uppermost communications node is a box end communications node;
the topside communications node is secured to a pipe joint that is separate from the pipe joint supporting the uppermost box end communications node; and
the uppermost box end communications node is configured to communicate with the topside communications node through acoustic signals send through a coupling with the separate pipe joint supporting the topside communications node.

43. The method of claim 34, wherein the conductive wire is embedded into the wall.

44. The method of claim 34, wherein:
the tubular body is a drill string; and
each of the communications nodes is placed along an outer surface of each of the pipe joints making up the drill string.

45. The method of claim 34, wherein:
the tubular body is a production string; and
each of the communications nodes is placed along an outer surface of each of the pipe joints making up the production string.

46. The method of claim 39, further comprising:
receiving signals from the topside communications node at the receiver at the surface; and
analyzing the signals.

47. The method of claim 39, wherein the at least one sensor comprises (i) a pressure sensor, (ii) a temperature sensor, (iii) an induction log, (iv) a gamma ray log, (v) a formation density sensor, (vi) a sonic velocity sensor, (vii) a vibration sensor, (viii) a resistivity sensor, (ix) a flow meter, (x) a microphone, (xi) a geophone, or (xii) a set of position sensors.

48. The method of claim 39, wherein:
each communications node comprises at least one clamp; and
the steps of attaching the communications nodes to the tubular body comprises clamping the communications nodes to an outer surface of the tubular body.

49. The method of claim 39, wherein:
the tubular body is a drill string; and
each of the communications nodes is placed within a cavity in the threaded connections making up the drill string.

50. The method of claim 34, wherein:
the tubular body is a well casing string; and each of the communications nodes is placed along an outer surface of each of the pipe joints making up the well casing string.

51. The method of claim 34, wherein:

the tubular body is a pipeline; and each of the communications nodes is placed along an outer surface of each of the pipe joints making up the pipeline.

* * * * *